(12) United States Patent
Seki et al.

(10) Patent No.: US 10,429,551 B2
(45) Date of Patent: Oct. 1, 2019

(54) MICROLENS ARRAY

(71) Applicant: NALUX CO., LTD., Osaka-shi, Osaka (JP)

(72) Inventors: Daisuke Seki, Osaka (JP); Norihisa Sakagami, Osaka (JP)

(73) Assignee: NALUX CO., LTD., Osaka-Shi, Osaka (JP)

(*) Notice: Subject to any disclaimer, the term of this patent is extended or adjusted under 35 U.S.C. 154(b) by 160 days.

(21) Appl. No.: 15/285,710

(22) Filed: Oct. 5, 2016

(65) Prior Publication Data

US 2017/0045648 A1 Feb. 16, 2017

Related U.S. Application Data

(63) Continuation-in-part of application No. PCT/JP2015/058919, filed on Mar. 24, 2015.
(Continued)

(51) Int. Cl.
*G02B 3/00* (2006.01)
*G02B 5/02* (2006.01)
(Continued)

(52) U.S. Cl.
CPC ......... *G02B 3/0056* (2013.01); *G02B 3/0006* (2013.01); *G02B 5/0215* (2013.01);
(Continued)

(58) Field of Classification Search
None
See application file for complete search history.

(56) References Cited

U.S. PATENT DOCUMENTS 5,225,935 A 7/1993 Watanabe et al.
6,816,311 B1 * 11/2004 Lissotschenko ......... G02B 3/06
359/618
(Continued)

FOREIGN PATENT DOCUMENTS

EP 0 426 441 B1 12/1996
EP 1 202 841 B1 9/2005
(Continued)

OTHER PUBLICATIONS

International Search Report & Written Opinion dated Jun. 16, 2015 corresponding to International Patent Application No. PCT/JP2015/058919 and English translation thereof.

*Primary Examiner* — Robert E. Tallman
*Assistant Examiner* — Gary W O'Neill
(74) *Attorney, Agent, or Firm* — Squire Patton Boggs (US) LLP

(57) ABSTRACT

A microlens array, each microlens containing N sides of a convex polygon and N curved surfaces corresponding to the sides, wherein when the line passing through the microlens vertex and perpendicular to the polygon plane is z axis, the line passing through the intersection point (origin) between z axis and the plane and perpendicular to a side is x axis, z coordinate of the curved surface corresponding to the side is $$z=f(x),$$

a distance from the origin to the side is t, a virtual curved surface in $0 \le |x| \le t$ is $$z=F(x),$$

refractive index of the microlens is no, A and C represents constants, and (Continued)

$$g(x) = \frac{dF(x)}{dx} = \frac{-x}{|x|} \cdot \frac{Cx^2 + A}{n_0\sqrt{1 + (Cx^2 + A)^2} - 1},$$

$$g(x) - 0.035 \leq \frac{df(x)}{dx} \leq g(x) + 0.035$$

is satisfied and f (x) is determined such that an illuminance distribution in an illuminated area is more uniform than that in the case that the curved surface is shaped in a segment of a circle.

8 Claims, 20 Drawing Sheets

Related U.S. Application Data

(60) Provisional application No. 61/975,941, filed on Apr. 7, 2014.

(51) Int. Cl.
*G02B 27/09* (2006.01)
*G02B 27/30* (2006.01)
*F21V 5/00* (2018.01)
*F21V 5/04* (2006.01)

(52) U.S. Cl.
CPC ....... *G02B 5/0231* (2013.01); *G02B 27/0961* (2013.01); *G02B 27/30* (2013.01); *F21V 5/004* (2013.01); *F21V 5/008* (2013.01); *F21V 5/04* (2013.01)

(56) References Cited

U.S. PATENT DOCUMENTS

| | | |
|---|---|---|
| 2006/0250707 A1 | 11/2006 | Whitney et al. |
| 2008/0192342 A1* | 8/2008 | Wood ................... G02B 3/0043 359/450 |
| 2010/0128351 A1 | 5/2010 | Epstein et al. |
| 2011/0013119 A1 | 1/2011 | Ha et al. |
| 2014/0009913 A1 | 1/2014 | Ha et al. |
| 2015/0168611 A1 | 6/2015 | Osawa et al. |
| 2016/0299327 A1* | 10/2016 | Grabher ............... G02B 21/086 |

FOREIGN PATENT DOCUMENTS

| | | |
|---|---|---|
| EP | 2 275 844 A1 | 1/2011 |
| JP | 3-233417 A | 10/1991 |
| JP | 11-133209 A | 5/1999 |
| JP | 2000-056101 A | 2/2000 |
| JP | 2003-504217 A | 2/2003 |
| JP | 2004-070102 A | 3/2004 |
| JP | 2008-542796 A | 11/2008 |
| JP | 2010-276831 A | 12/2010 |
| JP | 2012-509784 A | 4/2012 |
| WO | WO 2006/121690 A1 | 11/2006 |
| WO | WO 2010/059577 A2 | 5/2010 |
| WO | WO 2014/021232 A1 | 2/2014 |

* cited by examiner

MICROLENS ARRAY

TECHNICAL FIELD

The present invention relates to a microlens array for forming an illuminated area with a uniform illuminance distribution.

BACKGROUND ART

Optical elements for changing a distribution of light from a light source such that an illuminated area that is used as alignment marks or indications for visual recognition used in measuring devices, medical instruments, industrial robots and the like have been developed. Among such optical elements, there exist those in which divided portions of a cylindrical lens are combined (Patent Document 1) and those shaped in a pyramid with lateral surfaces having a cylindrical envelop (Patent Document 2).

However, a microlens array that is configured such that illumination distribution in an illuminated area formed on a surface becomes uniform to a satisfactory degree has not been developed conventionally.

PRIOR ART DOCUMENTS

Patent Documents

Patent Document 1: JP11-133209
Patent Document 2: JP2003-504217

SUMMARY OF INVENTION

Problem to be Solved by the Invention

Accordingly, there is a need for a microlens array that is configured such that illumination distribution in an illuminated area formed on a surface becomes uniform to a satisfactory degree.

Means for Solving the Problem

A microlens array according to an aspect of the present invention is provided with a plurality of microlenses. Each microlens contains N sides of a convex polygon, a microlens vertex that is away from a plane of the convex polygon, and N curved surfaces divided by lines connecting the microlens vertex and the N vertices of the convex polygon, and when the straight line that passes through the microlens vertex and is perpendicular to the plane is defined as z axis, the point of intersection between z axis and the plane is defined as the origin, the straight line in the plane that passes through the origin and is perpendicular to a side is defined as x axis, z coordinate of the curved surface corresponding to the side is represented by $$z = f(x),$$

a distance from the origin to the side is represented as t, a virtual curved surface in $0 \le |x| \le t$ is represented by $$z = F(x),$$

refractive index of a material of the microlens is $n_0$. A represents a nonnegative constant, C represents a positive constant, and $g(x)$ is defined by $$g(x) = \frac{dF(x)}{dx} = \frac{-x}{|x|} \cdot \frac{Cx^2 + A}{n_0\sqrt{1 + (Cx^2 + A)^2} - 1},$$

each microlens is configured such that $$g(x) - 0.035 \le \frac{df(x)}{dx} \le g(x) + 0.035$$

is satisfied in $0.25 \cdot t < |x| \le t$, and $f(x)$ is determined such that an illuminance distribution in an illuminated area shaped like lines and formed by a uniform bundle of parallel rays that is normally incident on the plane of the convex polygon on a plane perpendicular to the bundle of parallel rays is more uniform than an illuminance distribution in the case that the curved surface corresponding to the side is shaped in a segment of a circle.

Each curved surface of each micromlens of the microlens array according to the present aspect is formed such that a difference in gradient between the curved surface of each microlens and a virtual curved surface that makes an illuminance distribution in an illuminated area formed by a uniform bundle of parallel rays that is normally incident on the plane of the polygon of each microlens on a plane perpendicular to the bundle of parallel rays uniform is 0.035 or less in $0.25 \cdot t < |x| \le t$, and $f(x)$ is determined such that an illuminance distribution in an illuminated area shaped like lines and formed by a uniform bundle of parallel rays that is normally incident on the plane of the convex polygon on a plane perpendicular to the bundle of parallel rays is more uniform than an illuminance distribution in the case that the curved surface corresponding to the side is shaped in a segment of a circle. Accordingly, illuminance distribution in an illuminated area formed by a uniform bundle of parallel rays that is normally incident on the plane of the polygon of each microlens of the microlens array according to the present aspect on a plane perpendicular to the bundle of parallel rays becomes substantially uniform. Even if there exist variations in intensity of a bundle of parallel rays, an illuminance distribution in an illuminated area formed by the whole microlens array becomes substantially uniform, because the microlens array contains a plurality of microlenses. Further, since the area of each curved surface where $|x| < 0.25 \cdot t$ is satisfied is small, the gradient there is not important.

In the microlens array according to the first embodiment of the present invention, when an acute angle that the direction in which a ray that is normally incident on the plane and travels in the z axis direction travels after exiting from the virtual curved surface with z axis is represented by θ, θ at x=0 is represented by θc, and θ at |x|=t is represented by θe, the following relations hold $$A = \tan\theta_c$$

$$C = \frac{\tan\theta e - \tan\theta c}{t^2}, \text{ and}$$

$$\left|\frac{df(x)}{dx}\right| = \left|\frac{df(t)}{dx}\right| \ge 0.3$$

is satisfied at |x|=t, and f (x) is determined such that a value of relative illuminance that is defined such that the value corresponding to the maximum illuminance is 1 is 0.65 or more in an area corresponding to the rays in the range of $$\theta_c+0.1(\theta_e-\theta_c) \le \theta \le \theta_e-0.1(\theta_e-\theta_c).$$

According to the microlens array of the present embodiment, such a uniform illuminance distribution as is sufficient for practical use in such a wide range on an illuminated plane as is sufficient for practical use can be obtained by a bundle of parallel rays that is normally incident on the plane of the convex polygon.

In the microlens array according to the second embodiment of the present invention, $$g(x) - 0.015\left|\frac{df(t)}{dx}\right| \le \left|\frac{df(x)}{dx}\right| \le g(x) + 0.015\left|\frac{df(t)}{dx}\right|$$

is satisfied in $0.25 \cdot t < |x| \le t$.

According to the present embodiment, an illuminance distribution in an illuminated area formed by a uniform bundle of parallel rays that is normally incident on the plane of the convex polygon on a plane perpendicular to the bundle of parallel rays becomes further more uniform.

In the microlens array according to the third embodiment of the present invention, $$g(x) = \frac{df(x)}{dx}$$

is satisfied in $0.25 \cdot t < |x| \le t$.

According to the present embodiment, an illuminance distribution in an illuminated area formed by a uniform bundle of parallel rays that is normally incident on the plane of the convex polygon on a plane perpendicular to the bundle of parallel rays becomes fully uniform.

In the microlens array according to the fourth embodiment of the present invention, $$z=F(x)$$

monotonously decreases with $|x|$ in $0 \le |x| \le t$.

In the microlens array according to the fifth embodiment of the present invention, the convex polygon is a regular polygon.

In the microlens array according to the sixth embodiment of the present invention, z axis is defined such that it passes through the center of the regular polygon.

In the microlens array according to the seventh embodiment of the present invention, N is 3, 4 or 6.

In the microlens array according to the eighth embodiment of the present invention, each microlens is formed such that adjacent curved surfaces are different in shape For example, when curved surfaces corresponding to adjacent sides in the square are different in shape, an illuminated area in the shape of a cross with a substantially uniform illuminance distribution can be formed, and length of arms of the cross in the direction of one of the adjacent sides is different from that in the direction of the other of the adjacent sides.

The microlens array according to the ninth embodiment of the present invention is integrated with a collimator lens to form a single component.

According to the present embodiment, a compact optical element with a low price can be obtained.

In the microlens array according to the tenth embodiment of the present invention, when an acute angle that the direction in which a ray that is normally incident on the plane and travels in the z axis direction travels after exiting from the virtual curved surface with z axis is represented by $\theta$, $\theta$ at x=0 is represented by $\theta c$, and $\theta$ at $|x|=t$ is represented by $\theta e$, the following relations hold $$A = \tan\theta_c$$

$$C = \frac{\tan\theta e - \tan\theta c}{t^2}, \text{ and}$$

$$\left|\frac{df(x)}{dx}\right| = \left|\frac{df(t)}{dx}\right| \ge 0.3$$

is satisfied at $|x|=t$, and wherein when a light source having a circular emitting surface with a diameter of 0.5 millimeters and a collimator lens are arranged on an optical axis that passes through the center of the emitting surface and is aligned with the principal axis of the collimator lens, the light source has a Lambertian emission pattern, the collimator lens includes a transmitting surface and a reflecting surface forming an outside surface of the collimator lens and has a refractive index of 1.590, the vertex of the transmitting surface is on the optical axis and 2.25 millimeters away toward the microlenses from the point of intersection between the emitting surface and the optical axis (the reference point), the transmitting surface is represented by $$z(r) = \frac{\frac{1}{R} \cdot r^2}{1 + \sqrt{1 - (1+k)\frac{1}{R^2} \cdot r^2}}$$

where z represents distance in the z axis direction from the vertex of the transmitting surface to a point on the transmitting surface, r represents distance from the optical axis to the point on the transmitting surface, R=1.327 [mm], and k=−2.527, the vertex of the reflecting surface is on the optical axis and 0.45 millimeters away toward the opposite side of the microlenses from the reference point, the reflecting surface is represented by $$z(r)=a_2 r^2+a_4 r^4+a_6 r^6$$

where z represents distance in the z axis direction from the vertex of the reflecting surface to a point on the reflecting surface, r represents distance from the optical axis to the point on the reflecting surface, and $a_2$=3.44E-1, $a_4$=−5.56E-3, and $a_6$=7.68E-5, the end face on the light source side of the collimator lens is on a plane perpendicular to the optical axis, a distance between the reference point and the end face on the light source side of the collimator lens is 0.25 millimeters, the collimator lens has a tapered-cylinder-shaped concavity on the light source side, the central axis of the tapered-cylinder-shaped concavity is on the optical axis, an inside diameter of the tapered-cylinder-shaped concavity at the end on the light source side is 3.022 millimeters, an inside diameter of the tapered-cylinder-shaped concavity at the end on the microlens side is 2.9 millimeters, the end on the microlens side of the concavity is located on the transmitting surface and defines the periphery of the transmitting surface, a cross section of the reflecting surface, the cross section being perpendicular to the optical axis, is a circle, the circle has the maximum value of 10 millimeters at the end on the microlens side of the reflecting surface, and the bottom of the microlens array, the bottom being parallel to of the convex polygon, is arranged at a position that is 6.0 millimeters away in the optical axis direction from the reference point such that the bottom is perpendicular to the optical axis, f (x) is determined such that a value of relative illuminance that is defined such that the value corresponding to the maximum illuminance is 1 is 0.65 or more in an area corresponding to the rays in the range of $$\theta_c + 0.2(\theta_e - \theta_c) \leq \theta \leq \theta_e - 0.2(\theta_e - \theta_c).$$

According to the microlens array of the present embodiment, such a uniform illuminance distribution as is sufficient for practical use in such a wide range on an illuminated plane as is sufficient for practical use can be obtained by a predetermined light source and a predetermined collimator.

In the microlens array according to the eleventh embodiment of the present invention, the curved surface of the microlens is represented by $$z = f(x) = \sum_{n=1}^{10} \left(\frac{x}{|x|}\right)^n a_n x^n$$

where n represents a positive integer and $a_n$ represents a constant.

According to the present embodiment, an illuminance distribution in an illuminated area formed by a uniform bundle of parallel rays that is normally incident on the plane of the convex polygon on a plane perpendicular to the bundle of parallel rays can be made more uniform by adjusting constants $a_n$.

Figure 7:
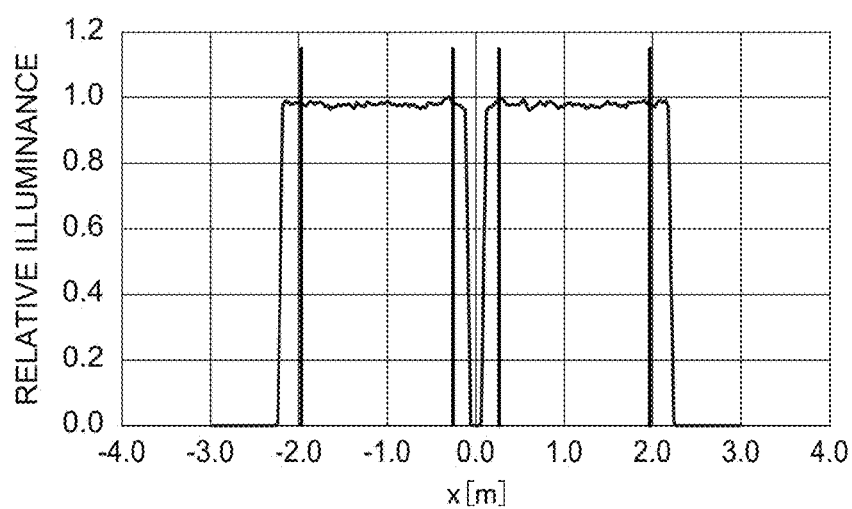
FIG. 7 shows an illuminance distribution in the horizontal direction of an illuminated area formed by the microlens array of Example 1 on a plane which is 3.0 meters distant from the center A1 of the light source in the direction of the optical axis and which is placed perpendicular to the optical axis.
Figure 10:
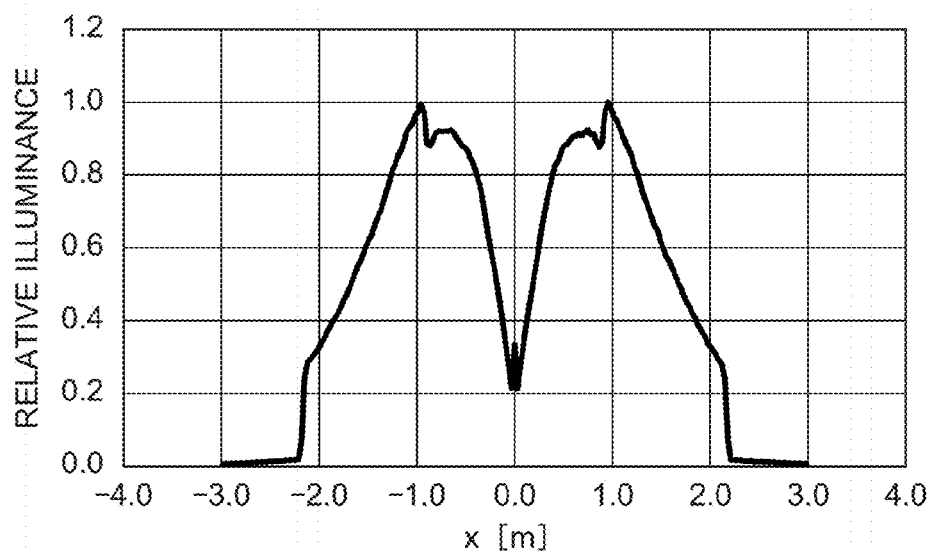
FIG. 10 shows an illuminance distribution in the horizontal direction of an illuminated area formed by the microlens of Comparative Example on a plane which is 3.0 meters distant from the center A1 of the light source in the direction of the optical axis and which is placed perpendicular to the optical axis.
Figure 13:
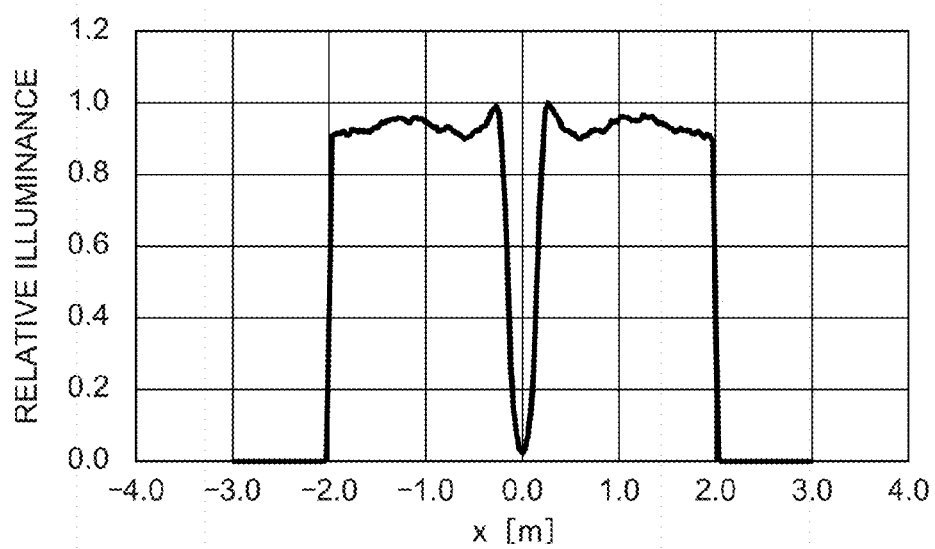
FIG. 13 shows an illuminance distribution in the horizontal direction of an illuminated area formed by the microlens of Example 2 on a plane which is 3.0 meters distant from the center A1 of the light source in the direction of the optical axis and which is placed perpendicular to the optical axis.
Figure 17:
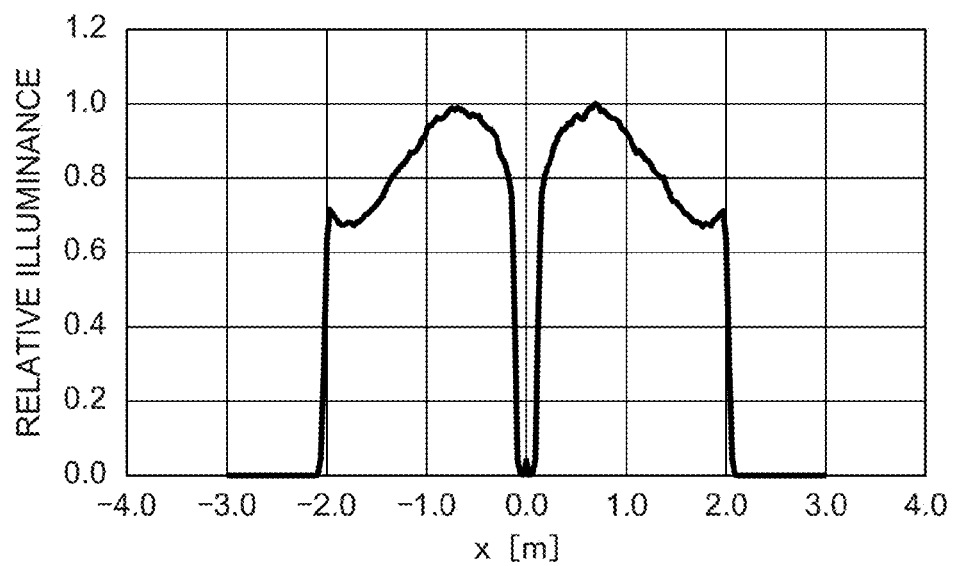
FIG. 17 shows an illuminance distribution in the horizontal direction of an illuminated area formed by the microlens of Example 3 on a plane which is 2.0 meters distant from the center A1 of the light source in the direction of the optical axis and which is placed perpendicular to the optical axis.
Figure 22:
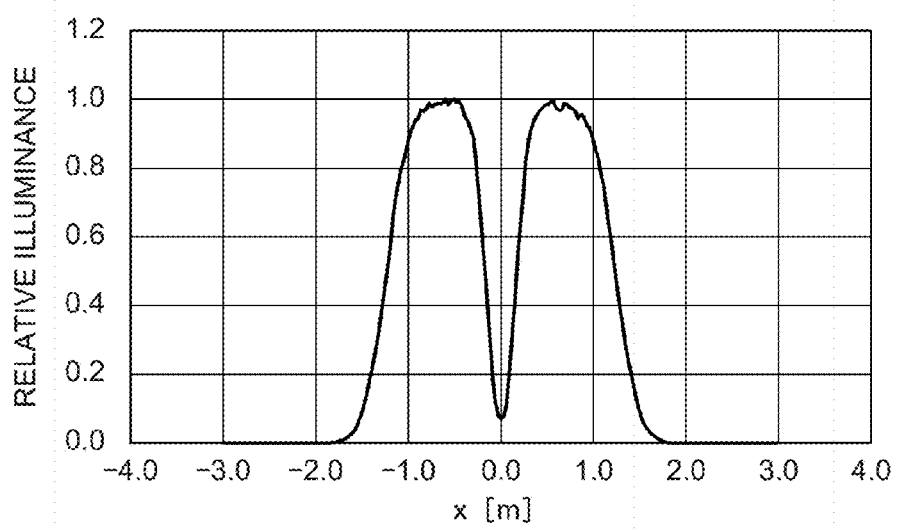
FIG. 22 shows an illuminance distribution in the horizontal direction of an illuminated area formed by the microlens array of Example 4 on a plane which is 3.0 meters distant from the center B1 of the light source in the direction of the optical axis and which is placed perpendicular to the optical axis.
Figure 23:
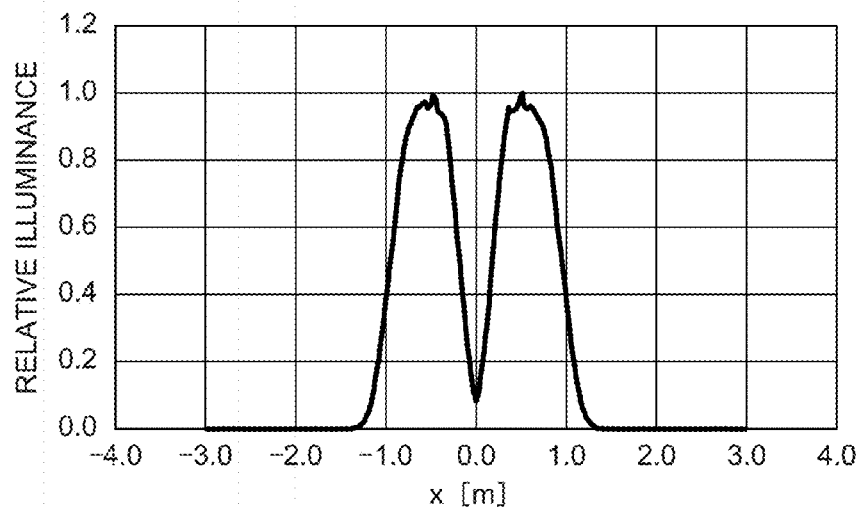
FIG. 23 shows an illuminance distribution in the vertical direction of an illuminated area formed by the microlens array of Example 4 on a plane which is 3.0 meters distant from the center B1 of the light source in the direction of the optical axis and which is placed perpendicular to the optical axis.
Figure 27:
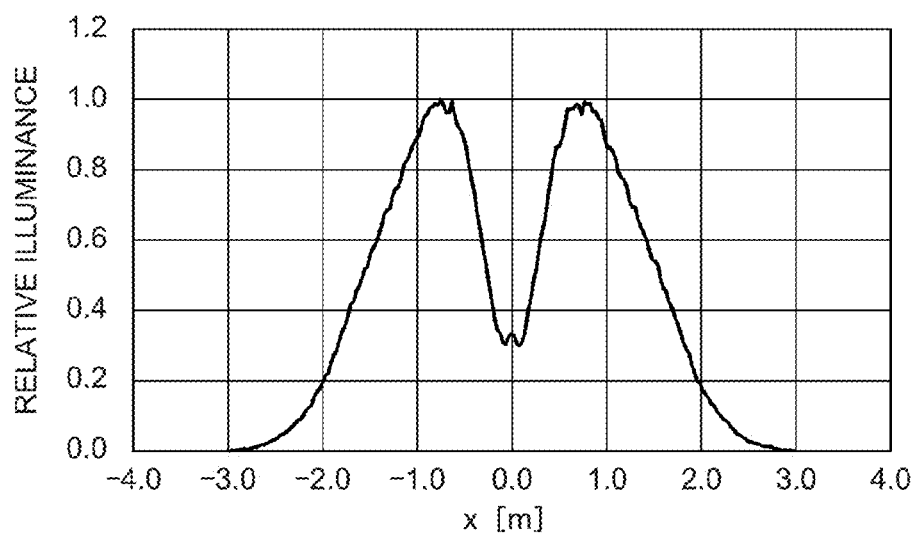
FIG. 27 shows an illuminance distribution in the horizontal direction of an illuminated area formed by the optical system of Comparative Example 2 on a plane which is 3.0 meters distant from the center B1 of the light source in the direction of the optical axis and which is placed perpendicular to the optical axis.
Figure 28:
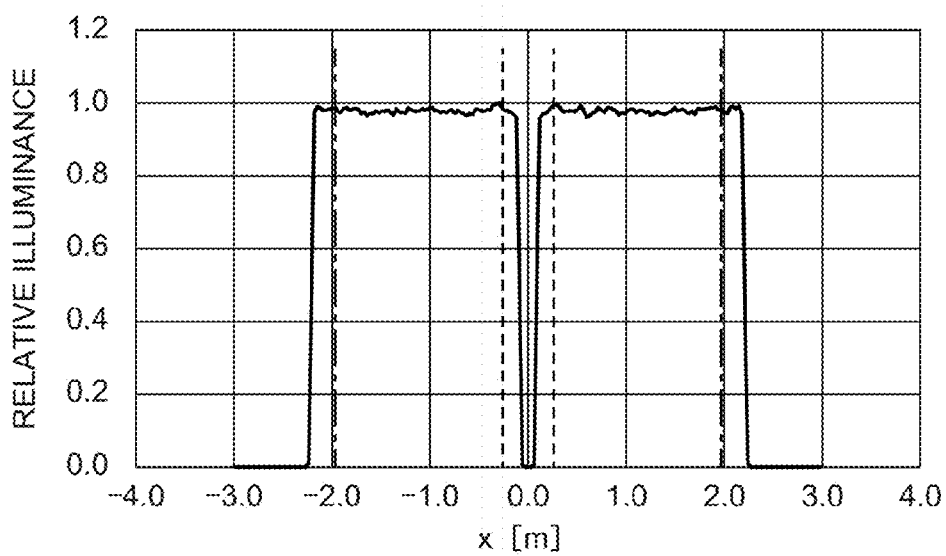
Figure 29:
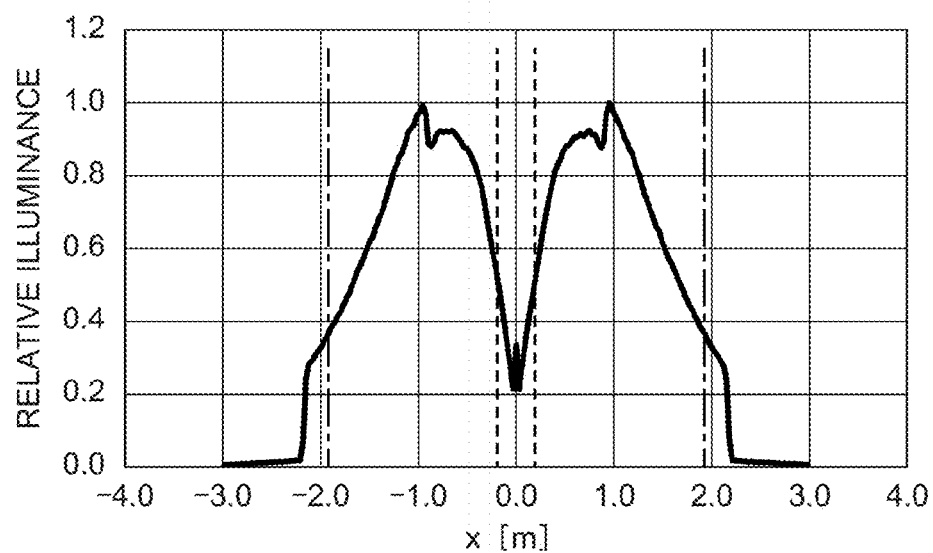
Figure 30:
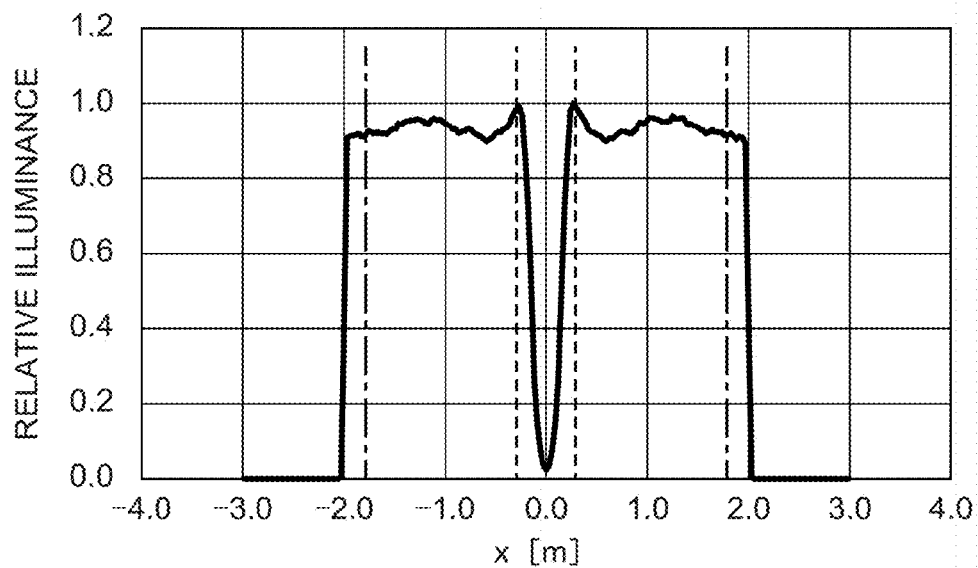
Figure 31:
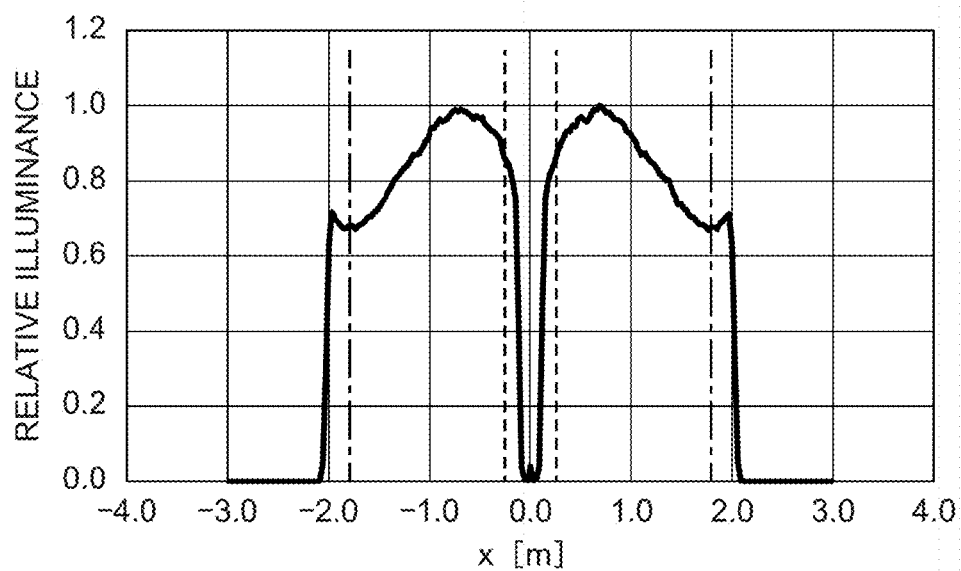
Figure 32:
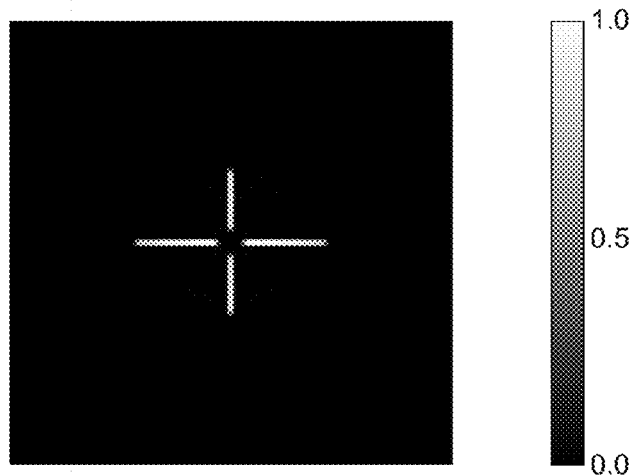
Figure 33:
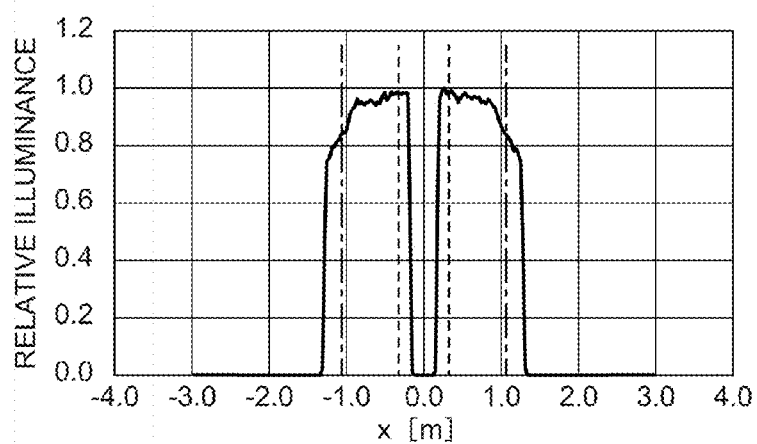
Figure 34:
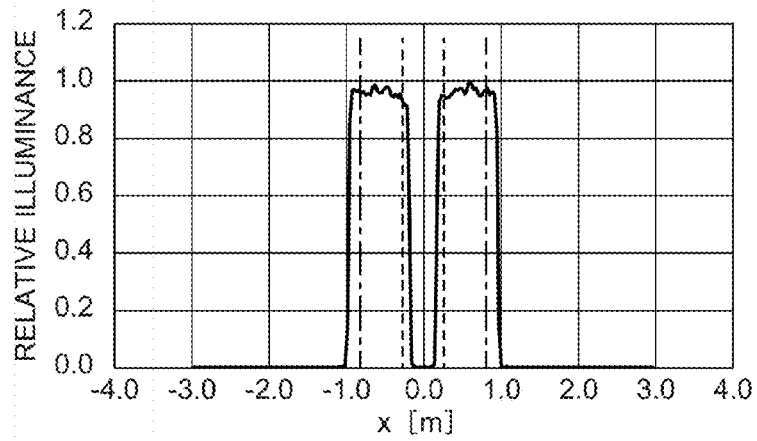
Figure 35:
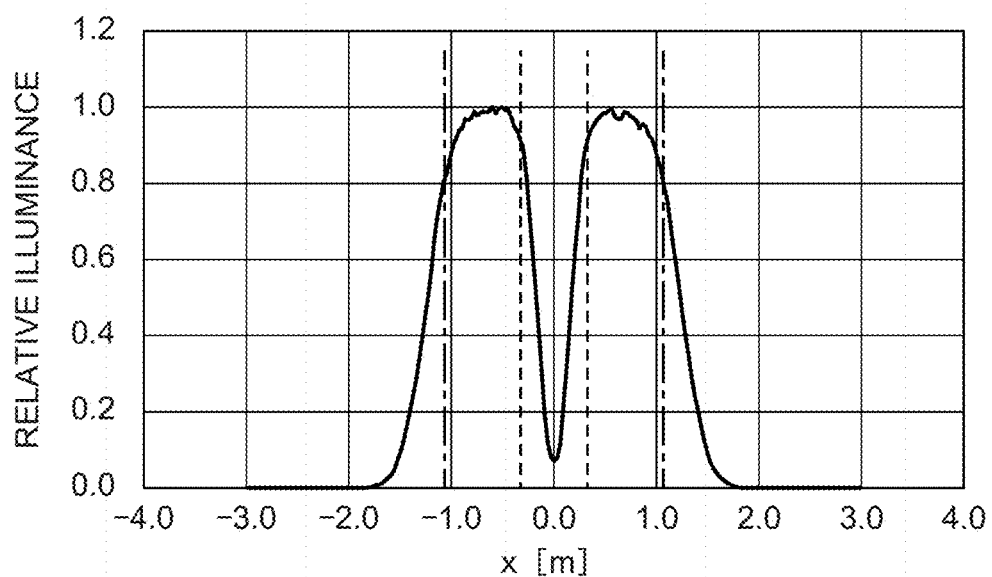
Figure 36:
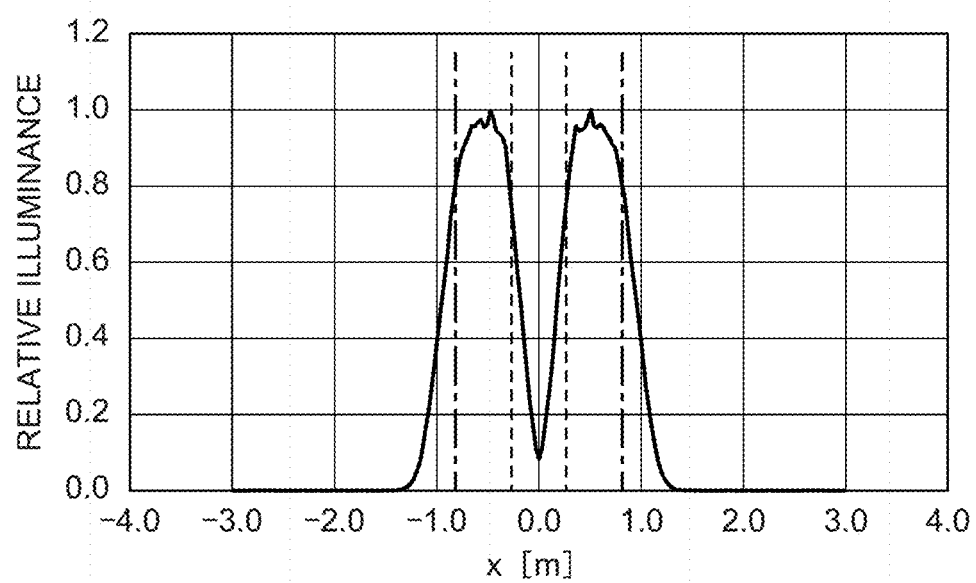
Figure 37:
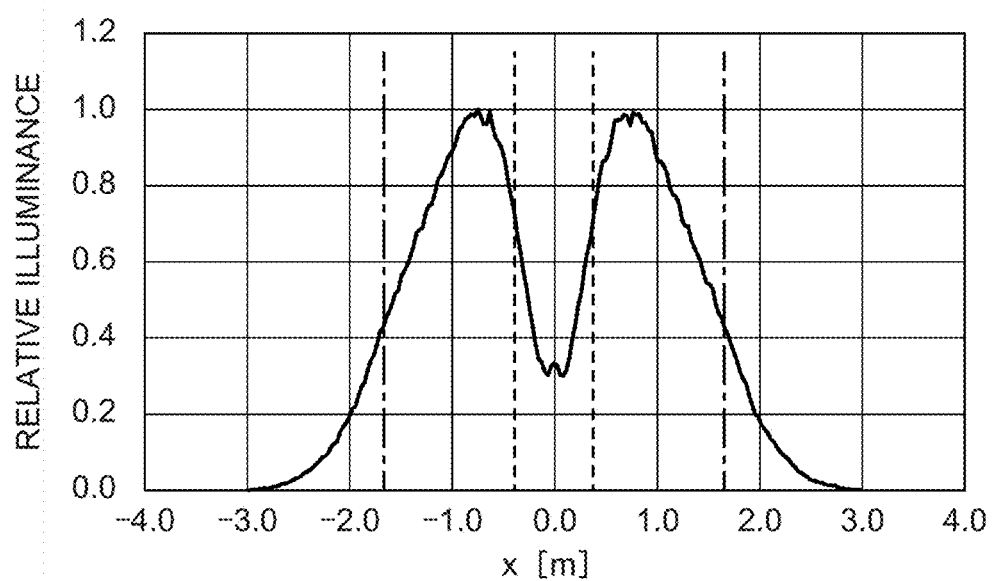

FIG. 28 shows positions that correspond to rays travelling in the direction at an acute angle $\theta_c+0.1(\theta_e-\theta_c)$ (which is referred to as $\theta_1$, hereinafter)

with z axis by broken lines, and positions that correspond to rays travelling in the direction at an acute angle $\theta_e-0.1(\theta_e-\theta_c)$ (which is referred to as $\theta_2$, hereinafter)

with z axis by dot-and-dash lines in FIG. 7, which shows an illuminance distribution in the horizontal direction of an illuminated area formed by the microlens of Example 1;

FIG. 29 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 10, which shows an illuminance distribution in the horizontal direction of an illuminated area formed by the microlens of Comparative Example;

FIG. 30 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 13, which shows an illuminance distribution in the horizontal direction of an illuminated area formed by the microlens of Example 2;

FIG. 31 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 17, which shows an illuminance distribution in the horizontal direction of an illuminated area formed by the microlens of Example 3;

FIG. 32 shows an illuminance distribution in the horizontal direction of an illuminated area formed by the microlens array of Example 4 on a plane which is 3.0 meters distant from the center B1 of the light source in the direction of the optical axis and which is placed perpendicular to the optical axis;

FIG. 33 shows an illuminance distribution in the horizontal direction of an illuminated area formed by the microlens of Example 4 on a plane which is 3.0 meters distant from the center B1 of the light source in the direction of the optical axis and which is placed perpendicular to the optical axis;

FIG. 34 shows an illuminance distribution in the vertical direction of an illuminated area formed by the microlens of Example 4 on a plane which is 3.0 meters distant from the center B1 of the light source in the direction of the optical axis and which is placed perpendicular to the optical axis;

FIG. 35 shows positions that correspond to rays travelling in the direction at an acute angle $\theta_c+0.2(\theta_e-\theta_c)$ (which is referred to as $\theta_3$, hereinafter)

with z axis by broken lines, and positions that correspond to rays travelling in the direction at an acute angle $\theta_e-0.2(\theta_e-\theta_c)$ (which is referred to as $\theta_4$, hereinafter)

with z axis by dot-and-dash lines in FIG. 22, which shows an illuminance distribution in the horizontal direction of an illuminated area formed by the optical system of Example 4;

FIG. 36 shows positions that correspond to rays travelling in the direction at an acute angle $\theta_3$ with z axis by broken lines, and positions that correspond to rays travelling in the direction at an acute angle $\theta_4$ with z axis by dot-and-dash lines in FIG. 23, which shows an illuminance distribution in the vertical direction of an illuminated area formed by the optical system of Example 4; and FIG. 37 shows positions that correspond to rays travelling in the direction at an acute angle $\theta_3$ with z axis by broken lines, and positions that correspond to rays travelling in the direction at an acute angle $\theta_4$ with z axis by dot-and-dash lines in FIG. 27, which shows an illuminance distribution in the horizontal direction of an illuminated area formed by the optical system of Comparative Example 2.

DESCRIPTION OF EMBODIMENTS

Figure 1:
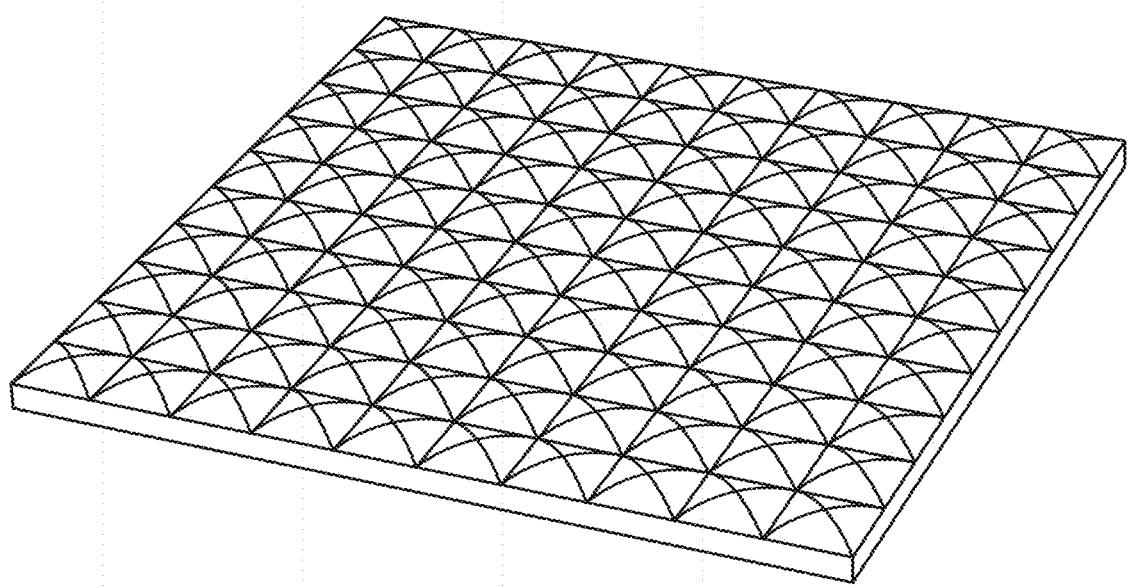
FIG. 1 shows a microlens array according to an embodiment of the present invention.

FIG. 1 shows a microlens array according to an embodiment of the present invention. The microlens array includes a plurality of microlenses of the same shape arranged on a plane.

Figure 2:
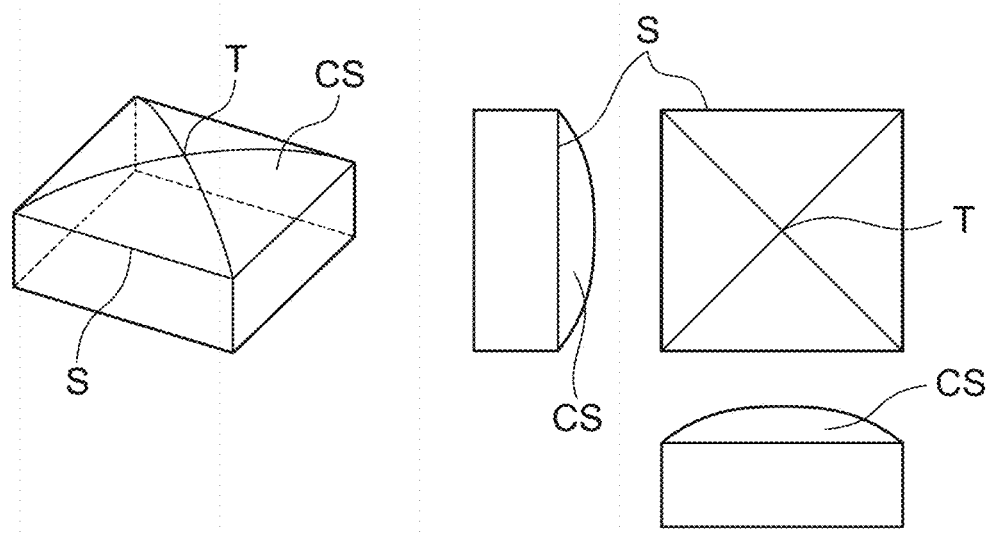
FIG. 2 shows a microlens that is a component of the microlens array shown in FIG. 1.

FIG. 2 shows a microlens that is a component of the microlens array shown in FIG. 1. The microlens includes the microlens vertex T and four curved surfaces CS that are defined by four sides S of a square and curved lines connecting the microlens vertex T and the four vertices of the square.

Figure 3:
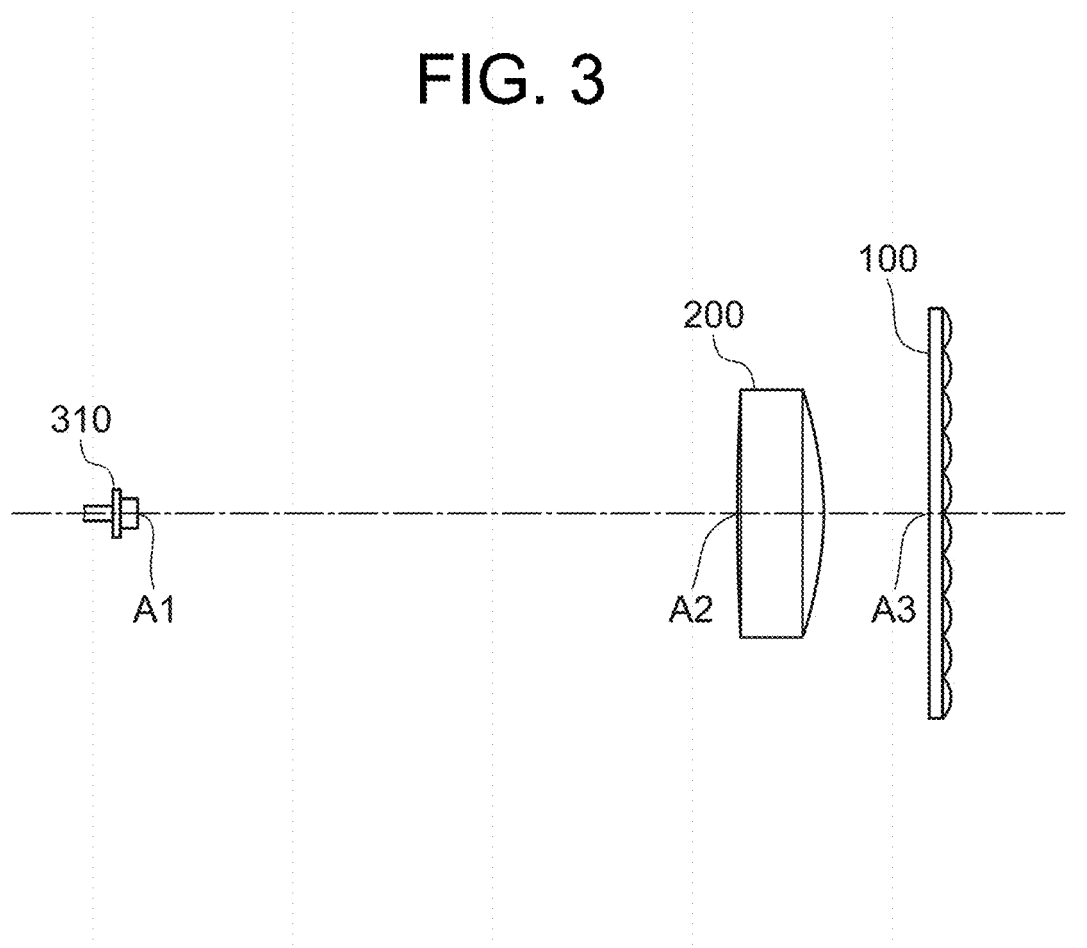
FIG. 3 shows an optical system including a light source, a collimator lens, and a microlens array.

FIG. 3 shows an optical system including a light source 310, a collimator lens 200, and a microlens array 100. In FIG. 3, the optical axis of the optical system is represented by a dot-and-dash line. The optical axis is defined such that it passes through the center A1 of the emitting surface of the light source 310, is aligned with the principal axis of the collimator lens 200 and is made orthogonal to the light-source side surface of the microlens array 100. Light emitted by the light source 310 is converted to a bundle of rays parallel to the optical axis by the collimator lens 200, and is made normally incident onto the light-source side surface of the microlens array 100. The bundle of parallel rays that has entered the microlens array 100 is made to travel in predetermined directions by the microlenses.

Figure 4:
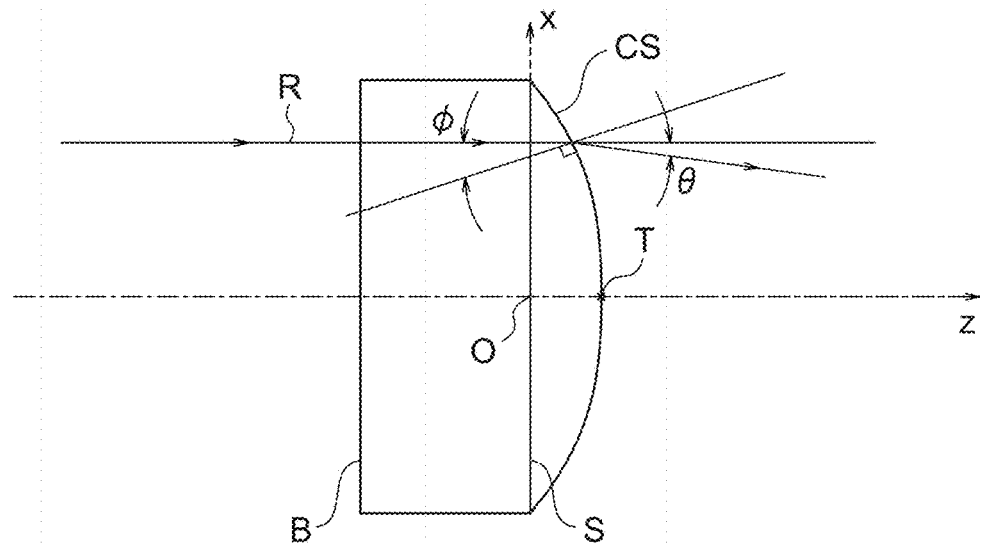
FIG. 4 is the first drawing for illustrating the function of the microlens.

FIG. 4 is the first drawing for illustrating the function of the microlens. The bottom B of the microlens is parallel to the four sides S of the square. The straight line that is orthogonal to the bottom B and passes through the microlens vertex T is defined as z axis. The point of intersection of z axis with the square is defined as the origin O, and in the plane that contains the square the straight line that passes through the origin O, is parallel to two sides of the square and is orthogonal to the other two sides of the square is defined as x-axis. FIG. 4 shows a cross section of the microlens that contains z axis and x axis. A curved surface CS that contains a side of the square that is perpendicular to x axis is shaped such that z coordinate of the curved surface is a function of x coordinate alone. That is, the curved surface CS is represented by the following expression.

$$z=f(x)$$

In the cross section shown in FIG. 4, a ray R that is normally incident on the bottom B of the microlens is incident on the curved surface at an angle of incidence $\phi$, and the outgoing direction is at an angle $\theta$ with respect z axis. That is, the angle $\theta$ is an acute angle between the traveling direction of the outgoing ray from the curved surface CS and z axis. As to the angle $\theta$ and the angle of incidence $\phi$, an angle measured clockwise from z axis is defined as positive, and an angle measured counter-clockwise from z axis is defined as negative. As clearly shown in FIG. 4, the angle $\theta$ is positive and the angle of incidence $\phi$ is negative in the range that x is positive, and the angle θ is negative and the angle of incidence φ is positive in the range that x is negative. The bundle of parallel rays that is normally incident on the bottom B is converted to a bundle of rays that is divergent only in a zx plane, after passing through the curved surface CS that contains a side of the square that is perpendicular to x axis. Accordingly, the shape of the illuminated area formed on a plane that is perpendicular to z axis is a line of a predetermined length in the x axis direction. Further, the shape of the illuminated area formed on a plane that is perpendicular to z axis by a bundle of parallel rays that is normally incident on the bottom B and passes through a curved surface CS that contains a side of the square that is parallel to x axis is a line of a predetermined length in the direction perpendicular to the x axis direction. Accordingly, the illuminated area formed on a plane that is perpendicular to z axis is shaped as a line of a predetermined length in the x axis direction and that in the direction perpendicular to the x axis direction.

Figure 5:
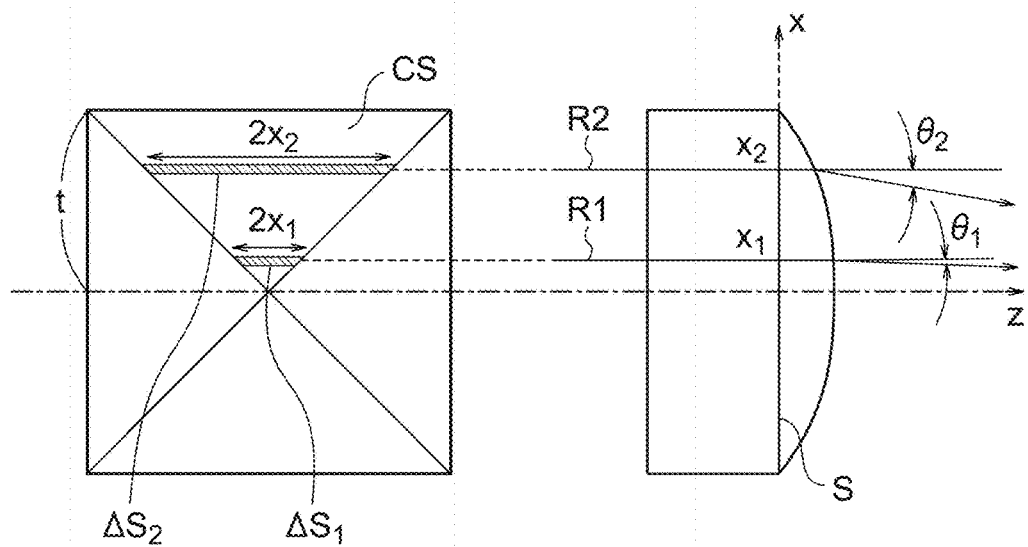
FIG. 5 is the second drawing for illustrating the function of the microlens.

FIG. 5 is the second drawing for illustrating the function of the microlens. The right side portion of FIG. 5 shows a cross section of the microlens, the cross section containing z axis and x axis. The left side portion of FIG. 5 shows a plan view of the microlens. Two rays that are normally incident on the bottom B of the microlens are represented by R1 and R2. Inside the microlens, the x coordinate of ray R1 is $x_1$, and the x coordinate of ray R2 is $x_2$. The relationship $x_1 < x_2$ holds. Ray R1 travels in the direction forming an angle $θ_1$ with z axis, and ray R2 travels in the direction forming an angle $θ_2$ with z axis.

As shown in FIG. 5, an infinitesimal area in the vicinity of coordinate x through which luminous flux passes is represented by the following expression.

$$ΔS = 2Δx · x$$

Accordingly, assuming that luminous flux density of incoming luminous flux is constant, the luminous flux that passes thorough $ΔS_1$ in the vicinity of $x=x_1$ that is closer to the center of the microlens and is refracted to the direction forming an angle $θ_1$ with z axis is smaller than the luminous flux that passes thorough $ΔS_2$ in the vicinity of $x=x_2$. Provided that distance L from the microlens to a plane which is perpendicular to z axis and on which an illuminance distribution is estimated is significantly greater than the size of the microlens, a ray refracted to the direction forming an angle $θ_1$ with z axis is considered to be projected onto a position on the plane, the position being L tan θ distant from the optical axis. Accordingly, a condition for uniform irradiance is represented by the following expression.

$$\frac{d}{dx}(\tan θ) = 2C · x \quad (1)$$

where C is a positive constant.

A virtual curved surface of the microlens that makes irradiance on a plane that is sufficiently distant from the microlens and perpendicular to z axis uniform is represented by the following expression.

$$z = F(x)$$

When the angle of inclination of z=F(x) with respect to x axis is represented by φ, the following expression holds.

$$\frac{dF(x)}{dx} = \tan φ \quad (2)$$

When the refractive index of the microlens is represented by n, the following expression holds according to the Snell's law.

$$\sin(-φ+θ) = n \sin(-φ) \quad (3)$$

In order to make irradiance uniform, Expressions (1) to (3) should be simultaneously satisfied. A large number of variables will be reduced below. The following expression can be obtained by a definite integral of Expression (1).

$$\tan θ = Cx^2 ± A = X \quad (4)$$

where A is a nonnegative constant.

Assuming that a distance from the origin to a side of the square is t, the following expression can be obtained by substituting x=0 and x=t into Expression (4).

$$\tan θ_T = A$$

$$\tan θ_S = Ct^2 + A$$

where $θ_T$ is an acute angle between the direction in which a ray leaving the curved surface CS at the vertex of the microlens travels and z axis, and $θ_S$ is an acute angle between the direction in which a ray leaving the curved surface CS on a side of the square travels and z axis. The following expression is led from the expressions described above.

$$C = \frac{\tan θ_S - \tan θ_T}{t^2}$$

The following expressions can be led by changing Expression (4).
In the case of X≥0

$$\sin θ = \sqrt{\frac{X^2}{1+X^2}} \quad (5a)$$

In the case of X<0

$$\sin θ = \sqrt{\frac{X^2}{1+X^2}} \quad (5b)$$

$$\cos θ = \sqrt{\frac{1}{1+X^2}} \quad (6)$$

On the other hand, the following expression can be obtained by changing Expression (3).

$$\sin θ \cos φ - \cos θ \sin φ = -n \sin φ$$

Further, the following expression can be obtained.

$$\tan φ = \frac{-\sin θ}{n - \cos θ} \quad (7)$$

The following expressions can be obtained by arranging Expressions (2), (5a), (6) and (7).
In the case of X≥0

$$\frac{dF(x)}{dx} = \frac{X}{n\sqrt{1+X^2}-1} = -\frac{Cx^2+A}{n\sqrt{1+(Cx^2+A)^2}-1} \quad (8a)$$

Further, the following expressions can be obtained by arranging Expressions (2), (5b), (6) and (7).
In the case of X<0

$$\frac{dF(x)}{dx} = \frac{X}{n\sqrt{1+X^2}-1} = \frac{Cx^2+A}{n\sqrt{1+(Cx^2+A)^2}-1} \quad (8b)$$

Accordingly, a microlens with a cross section that satisfies Expressions (8a) and (8b) makes irradiance on a plane that is sufficiently distant from the microlens and perpendicular to z axis uniform.

Even if uniformity of luminous flux density of incoming radiant flux is not guaranteed, the whole irradiance distribution that is formed as a combination of distributions caused by plural microlenses is made uniform provided that the number of the microlenses is sufficiently great.

Expressions (8a) and (8b) can be represented by the following expression.

$$g(x) = \frac{dF(x)}{dx} = \frac{-x}{|x|} \cdot \frac{Cx^2+A}{n\sqrt{1+(Cx^2+A)^2}-1} \quad (9)$$

In general, the condition that a curved surface f(x) of a microlens realizes such a uniform irradiance distribution as is sufficient for various applications can be represented by the following expression.

$$g(x) - 0.035 \le \frac{df(x)}{dx} \le g(x) + 0.035 \quad (10)$$

Further, when $$g(x) - 0.015 \left|\frac{df(t)}{dx}\right| \le \frac{df(t)}{dx} \le g(x) + 0.015 \left|\frac{df(t)}{dx}\right|$$

is satisfied, a more uniform irradiance distribution can be obtained.

Further, since the contribution to irradiance distribution is roughly proportional to an area of the optical surface, the whole irradiance distribution is not significantly affected and the function will not deteriorate even if Expression (10) is not satisfied in a restricted area in the vicinity of the optical axis. For example, the area of the region in which distance t from the optical axis is 25% or less occupies approximately 6%, and therefore an almost uniform radial irradiance distribution can be obtained even if in this region, Expression (10) does not hold and, however, in the other region, Expression (10) is satisfied.

Examples and a comparative example will be described below.

Optical Systems of Examples 1-2 and Comparative Example

The optical systems of Examples 1-2 and Comparative Example are that shown in FIG. 3. The specifications of collimator lenses 200 used in Examples 1-2 and Comparative Example are the same. The specifications of the collimator lenses 200 are described below.

Position (with respect to the center of the light source): Z=30 [mm]
Material: BK7 (refractive index: n=1.519)
Thickness: 4.0 [mm]
Radius of curvature at the center of the entry surface: 130.7 [mm]
Radius of curvature at the center of the exit surface: −19.38 [mm]

The position of the collimator lens 200 means the position of the point of intersection between the entry surface of the collimator lens 200 and the optical axis, that is, the position marked with A2 in FIG. 3. Z=30 [mm] means that the distance between the center A1 of the light source and A2 is 30 millimeters. Thickness of the collimator lens 200 means the center thickness along the optical axis.

The specifications of microlenses used in Examples 1-2 and Comparative Example are common except for the shape of the curved surface CS, and are described below. Thus, the microlens arrays of Example 2 and Comparative Example are substantially the same with the microlens array of Example 1 shown in Example 1.

Position (with respect to the center of the light source): Z=40 [mm] Material: polycarbonate (refractive index: n=1.590)
Thickness: 1.0 [mm]
Polygon: Square
Size of the square: Square with sides each of which is 2.0 millimeters long The position of the microlens array 100 means the position of the point of intersection between the surface without lenses, that is, the bottom of the microlens array 100 and the optical axis, that is, the position marked with A3 in FIG. 3. Z=40 [mm] means that the distance between the center A1 of the light source and A3 is 40 millimeters. Thickness of the microlens array 100 means the distance from the bottom to the vertex of a microlens, that is, the distance from B to T in FIG. 4.

Microlens of Example 1

The curved surface of the microlens of Example 1 can be represented by the following expression.

$$z = f(x) = \sum_{n=1}^{10} \left(\frac{x}{|x|}\right)^n a_n x^n \quad (11)$$

Table 1 shows coefficients of Expression (11) that represents the curved surface of the microlens of Example 1.

TABLE 1

| a1 | a2 | a3 | a4 | a5 |
|---|---|---|---|---|
| −0.050 | −0.003 | −0.406 | 0.044 | −0.185 |
| a6 | a7 | a8 | a9 | a10 |
| 0.396 | −0.159 | 0.000 | 0.000 | 0.000 |

Figure 6:
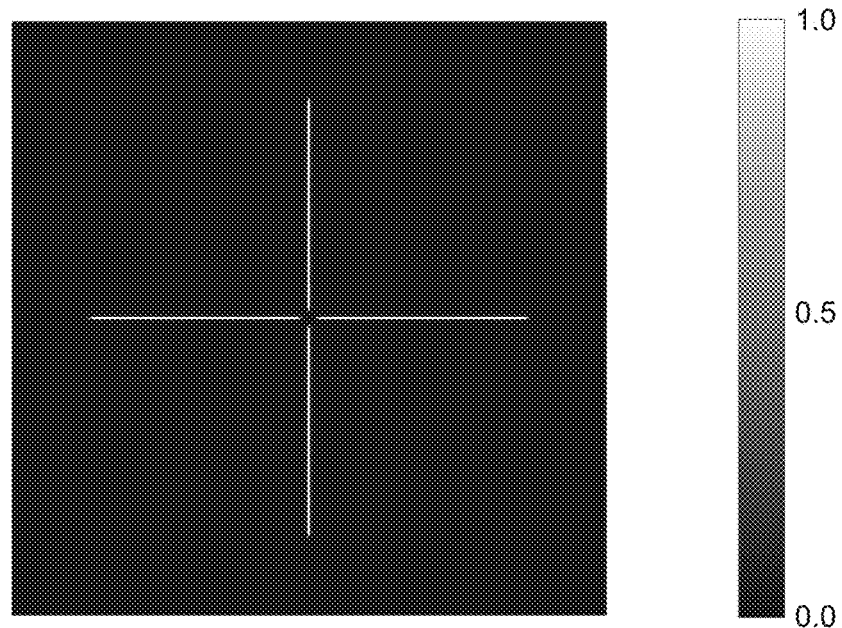
FIG. 6 shows an illuminance distribution in an illuminated area formed by the microlens array of Example 1 on a plane which is 3.0 meters distant from the center A1 of the light source in the direction of the optical axis and which is placed perpendicular to the optical axis.

FIG. 6 shows an illuminance distribution in an illuminated area formed by the microlens array of Example 1 on a plane which is 3.0 meters distant from the center A1 of the light source in the direction of the optical axis and which is placed perpendicular to the optical axis. In FIG. 3 which shows Example 1, the optical axis is in the horizontal direction. Each microlens is placed such that two sides of the square of the microlens are in the horizontal direction and the other two sides are in the vertical direction. Accordingly, as shown in FIG. 6, an illuminated area having an irradiance distribution shaped like lines of a predetermined length in the horizontal direction and in the vertical direction appears.

FIG. 7 shows an illuminance distribution in the horizontal direction of an illuminated area formed by the microlens array of Example 1 on a plane which is 3.0 meters distant from the center A1 of the light source in the direction of the optical axis and which is placed perpendicular to the optical axis. The horizontal axis of FIG. 7 represents position on the plane in the horizontal direction. The position where the optical axis intersects the plane corresponds to the position of coordinate 0.0 on the horizontal axis. The vertical axis of FIG. 7 represents relative illuminance. Relative illuminance of 1 corresponds to the maximum value.

Figure 8:
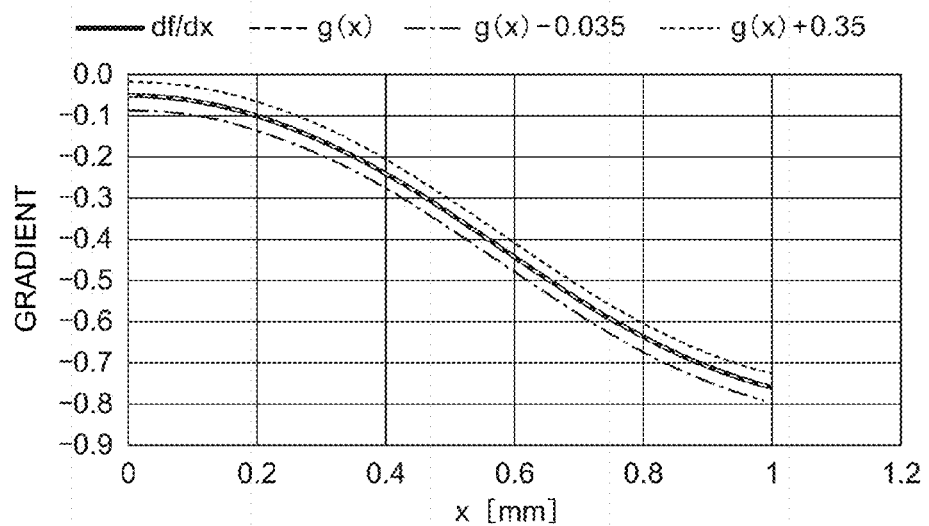
FIG. 8 shows the gradient of the curved surface of the microlens of Example 1.

FIG. 8 shows the gradient of the curved surface of the microlens of Example 1. The horizontal axis of FIG. 8 represents coordinate of x axis of the microlens, and the vertical axis of FIG. 8 represents the gradient of the curved surface of the microlens of Example 1

$$\frac{df(x)}{dx}$$

and the gradient of the virtual curved surface $$g(x) = \frac{dF(x)}{dx}$$

that makes an illuminance distribution uniform. The gradient of the curved surface of the microlens of Example 1 satisfies Expression (10) in the whole range of x.

Further, since the following relation holds $$\left|\frac{df(t)}{dx}\right| = 0.759,$$

concerning the gradient of the curved surface of the microlens of Example 1, $$g(x) - 0.015\left|\frac{df(t)}{dx}\right| \le \frac{df(x)}{dx} \le g(x) + 0.015\left|\frac{df(t)}{dx}\right|$$

is satisfied in the range of $0.25 \cdot t < |x| \le t$.

Microlens of Comparative Example

The microlens of Comparative Example is shaped in a segment of a circle and the radius of curvature at the center is 1.66 millimeters.

Figure 9:
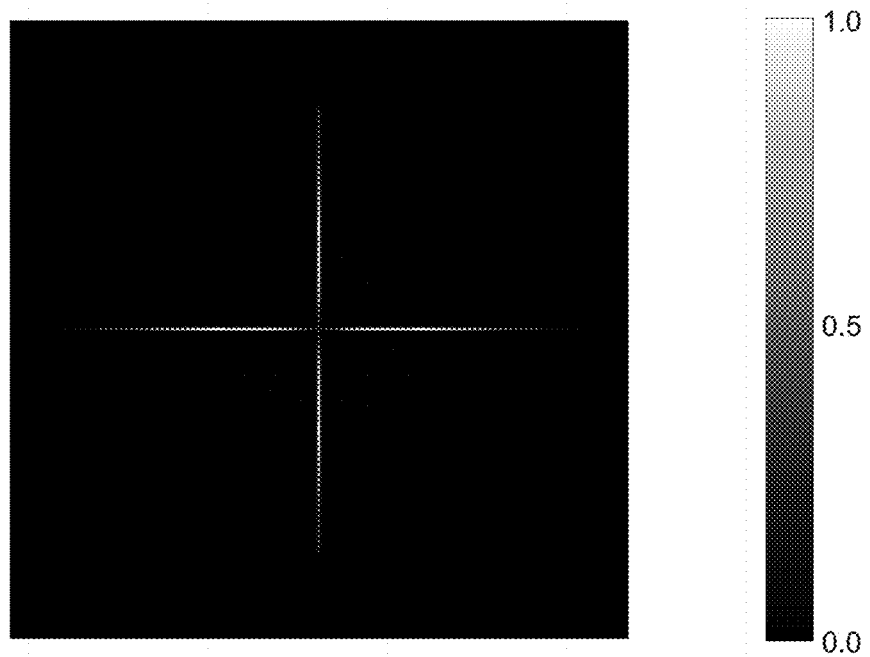
FIG. 9 shows an illuminance distribution in an illuminated area formed by the microlens array of Comparative Example on a plane which is 3.0 meters distant from the center A1 of the light source in the direction of the optical axis and which is placed perpendicular to the optical axis.

FIG. 9 shows an illuminance distribution in an illuminated area formed by the microlens array of Comparative Example on a plane which is 3.0 meters distant from the center A1 of the light source in the direction of the optical axis and which is placed perpendicular to the optical axis. In FIG. 3 which shows Comparative Example, the optical axis is in the horizontal direction. Each microlens is placed such that two sides of the square of the microlens are in the horizontal direction and the other two sides are in the vertical direction. Accordingly, as shown in FIG. 9, an illuminated area having an irradiance distribution shaped like lines of a predetermined length in the horizontal direction and in the vertical direction appears.

FIG. 10 shows an illuminance distribution in the horizontal direction of an illuminated area formed by the microlens of Comparative Example on a plane which is 3.0 meters distant from the center A1 of the light source in the direction of the optical axis and which is placed perpendicular to the optical axis. The horizontal axis of FIG. 10 represents position on the plane in the horizontal direction. The position where the optical axis intersects the plane corresponds to the position of coordinate 0.0 on the horizontal axis. The vertical axis of FIG. 10 represents relative illuminance. Relative illuminance of 1 corresponds to the maximum value.

Figure 11:
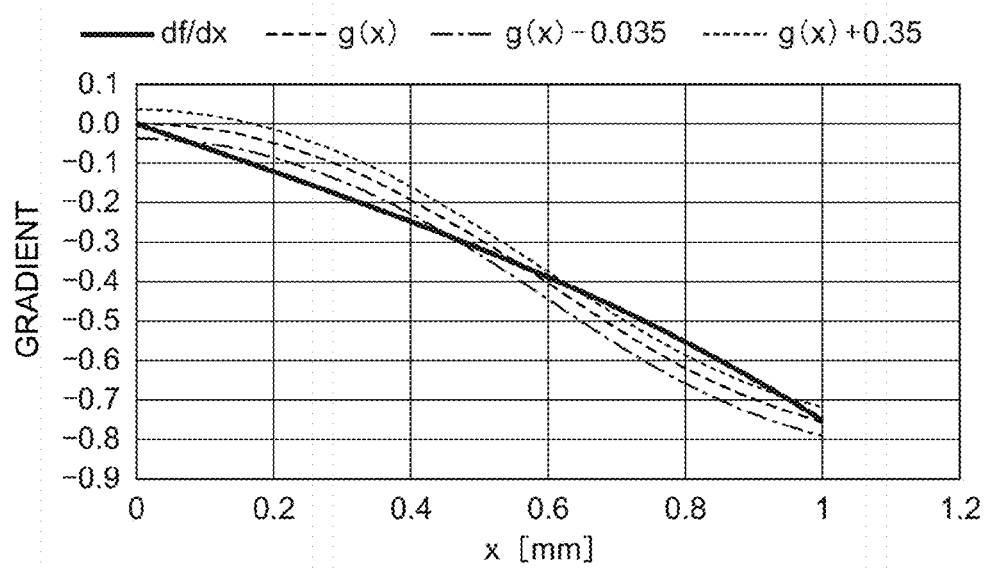
FIG. 11 shows the gradient of the curved surface of the microlens of Comparative Example.

FIG. 11 shows the gradient of the curved surface of the microlens of Comparative Example. The horizontal axis of FIG. 11 represents coordinate of x axis of the microlens, and the vertical axis of FIG. 11 represents the gradient of the curved surface of the microlens of Comparative Example $$\frac{df(x)}{dx}$$

and the gradient of the virtual curved surface $$g(x) = \frac{dF(x)}{dx}$$

that makes an illuminance distribution uniform. The gradient of the curved surface of the microlens of Comparative Example does not satisfy Expression (10) in 70% or more of the whole range of x.

If the curved surface of the microlens of Comparative Example represented by the solid line in FIG. 11 and shaped in a segment of a circle is brought closer to the gradient g(x) of the virtual curved surface, an illuminance distribution in an illuminated area formed by a uniform bundle of parallel rays that is in the optical axis direction and normally incident on the plane of the convex polygon on a plane perpendicular to the optical axis becomes more uniform.

In general, if a curved surface of a microlens is represented by a segment of any circle and the curved surface is brought closer to the gradient g(x) of the virtual curved surface, an illuminance distribution in an illuminated area formed by a uniform bundle of parallel rays that is normally incident on the plane of the convex polygon on a plane perpendicular to the bundle of parallel rays becomes more uniform than in the case that the curved surface is represented by the segment of the circle.

Microlens of Example 2

The curved surface of the microlens of Example 2 can be represented by the following expression.

$$z = f(x) = \sum_{n=1}^{10} \left(\frac{x}{|x|}\right)^n a_n x^n \qquad (11)$$

Table 2 shows coefficients of Expression (11) that represents the curved surface of the microlens of Example 2.

TABLE 2

| a1 | a2 | a3 | a4 | a5 |
|---|---|---|---|---|
| 0.000 | −0.600 | 1.912 | −4.604 | 5.088 |
| a6 | a7 | a8 | a9 | a10 |
| −2.754 | 0.604 | 0.000 | 0.000 | 0.000 |

Figure 12:
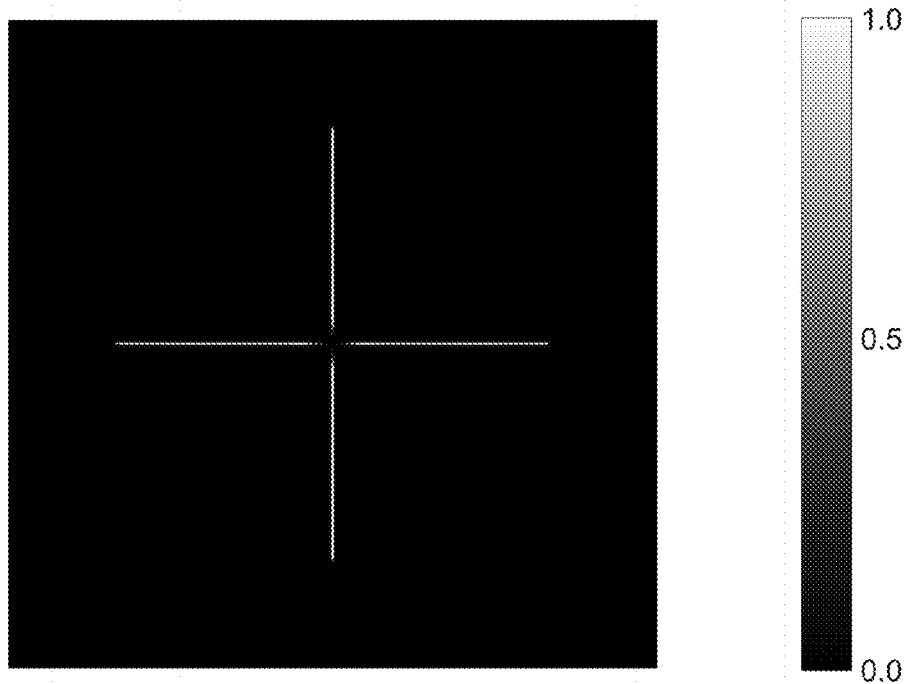
FIG. 12 shows an illuminance distribution in an illuminated area formed by the microlens array of Example 2 on a plane which is 3.0 meters distant from the center A1 of the light source in the direction of the optical axis and which is placed perpendicular to the optical axis.

FIG. 12 shows an illuminance distribution in an illuminated area formed by the microlens array of Example 2 on a plane which is 3.0 meters distant from the center A1 of the light source in the direction of the optical axis and which is placed perpendicular to the optical axis. In FIG. 3 which shows Example 2, the optical axis is in the horizontal direction. Each microlens is placed such that two sides of the square of the microlens are in the horizontal direction and the other two sides are in the vertical direction. Accordingly, as shown in FIG. 12, an illuminated area having an irradiance distribution shaped like lines of a predetermined length in the horizontal direction and in the vertical direction appears.

FIG. 13 shows an illuminance distribution in the horizontal direction of an illuminated area formed by the microlens of Example 2 on a plane which is 3.0 meters distant from the center A1 of the light source in the direction of the optical axis and which is placed perpendicular to the optical axis. The horizontal axis of FIG. 13 represents position on the plane in the horizontal direction. The position where the optical axis intersects the plane corresponds to the position of coordinate 0.0 on the horizontal axis. The vertical axis of FIG. 13 represents relative illuminance. Relative illuminance of 1 corresponds to the maximum value.

Figure 14:
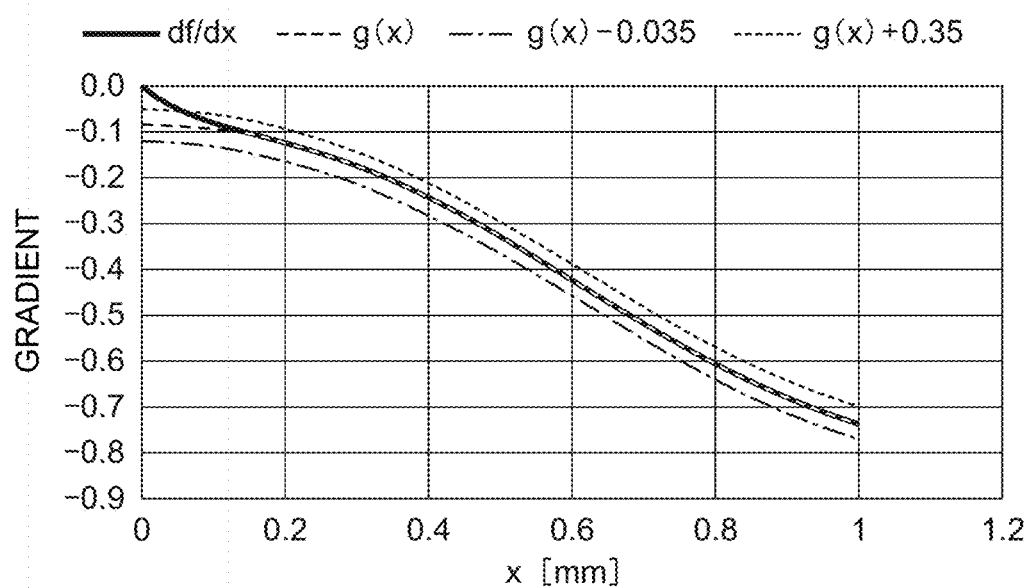
FIG. 14 shows the gradient of the curved surface of the microlens of Example 2.

FIG. 14 shows the gradient of the curved surface of the microlens of Example 2. The horizontal axis of FIG. 14 represents coordinate of x axis of the microlens, and the vertical axis of FIG. 14 represents the gradient of the curved surface of the microlens of Example 2

$$\frac{df(x)}{dx}$$

and the gradient of the virtual curved surface $$g(x) = \frac{dF(x)}{dx}$$

that makes an illuminance distribution uniform. The gradient of the curved surface of the microlens of Example 2 satisfies Expression (10) except in the range of x<0.1.

Further, since the following relation holds $$\left|\frac{df(t)}{dx}\right| = 0.736,$$

concerning the gradient of the curved surface of the microlens of Example 2, $$g(x) - 0.015\left|\frac{df(t)}{dx}\right| \leq \frac{df(x)}{dx} \leq g(x) + 0.015\left|\frac{df(t)}{dx}\right|$$

is satisfied in the range of 0.25·t<|x|≤t.

Optical System and Microlens of Example 3

The optical system of Examples 3 is that shown in FIG. 3. The specifications of collimator lense 200 used in Examples 3 are described below.

Position (with respect to the center of the light source): Z=30 [mm]

Material: BK7 (refractive index: n=1.519)

Thickness: 4.0 [mm]

Radius of curvature at the center of the entry surface: 130.7 [mm]

Radius of curvature at the center of the exit surface: −19.38 [mm]

The position of the collimator lens 200 means the position of the point of intersection between the entry surface of the collimator lens 200 and the optical axis, that is, the position marked with A2 in FIG. 3. Z=30 [mm] means that the distance between the center A1 of the light source and A2 is 30 millimeters. Thickness of the collimator lens 200 means the center thickness along the optical axis.

Figure 15:
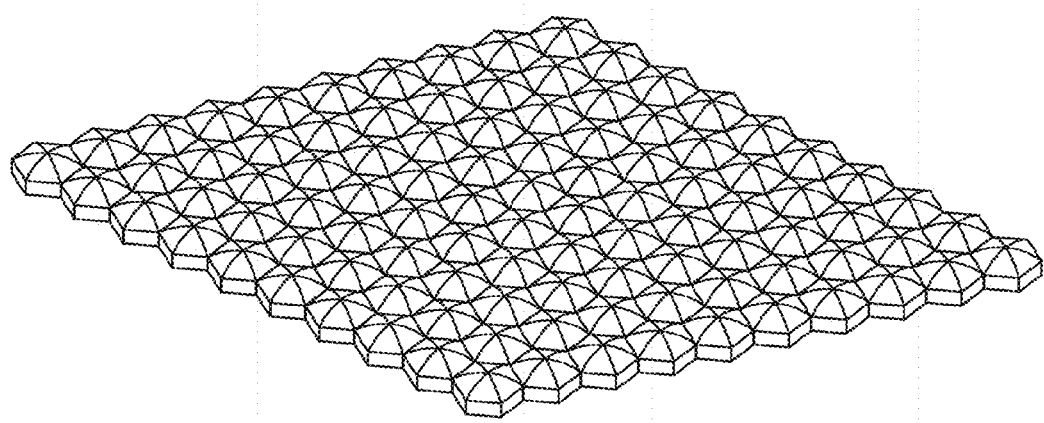
FIG. 15 shows the microlens array of Example 3.

FIG. 15 shows the microlens array of Example 3.

The specifications of microlenses used in Example 3 are described below.

Position (with respect to the center of the light source): Z=40 [mm]

Material: polycarbonate (refractive index: n=1.590)

Thickness: 1.0 [mm]

Polygon: Regular hexagon

Size of the regular hexagon: Regular hexagon in which distance between opposite sides (horizontal length) is 2.0 millimeters and distance between opposite vertices (vertical length) is 2.309 millimeters.

The position of the microlens array 100 means the position of the point of intersection between the surface without lenses, that is, the bottom of the microlens array 100 and the optical axis, that is, the position marked with A3 in FIG. 3. Z=40 [mm] means that the distance between the center A1 of the light source and A3 is 40 millimeters. Thickness of the microlens array 100 means the distance from the bottom to the vertex of the microlen, that is, the distance from B to T in FIG. 4.

The curved surface of the microlens of Example 3 can be represented by the following expression.

$$z = f(x) = \sum_{n=1}^{10} \left(\frac{x}{|x|}\right)^n a_n x^n \tag{11}$$

Table 3 shows coefficients of Expression (11) that represents the curved surface of the microlens of Example 3.

TABLE 3

| a1 | a2 | a3 | a4 | a5 |
|---|---|---|---|---|
| −0.100 | −0.002 | −0.210 | 0.014 | −0.035 |
| a6 | a7 | a8 | a9 | a10 |
| 0.066 | 0.000 | 0.000 | 0.000 | 0.000 |

Figure 16:
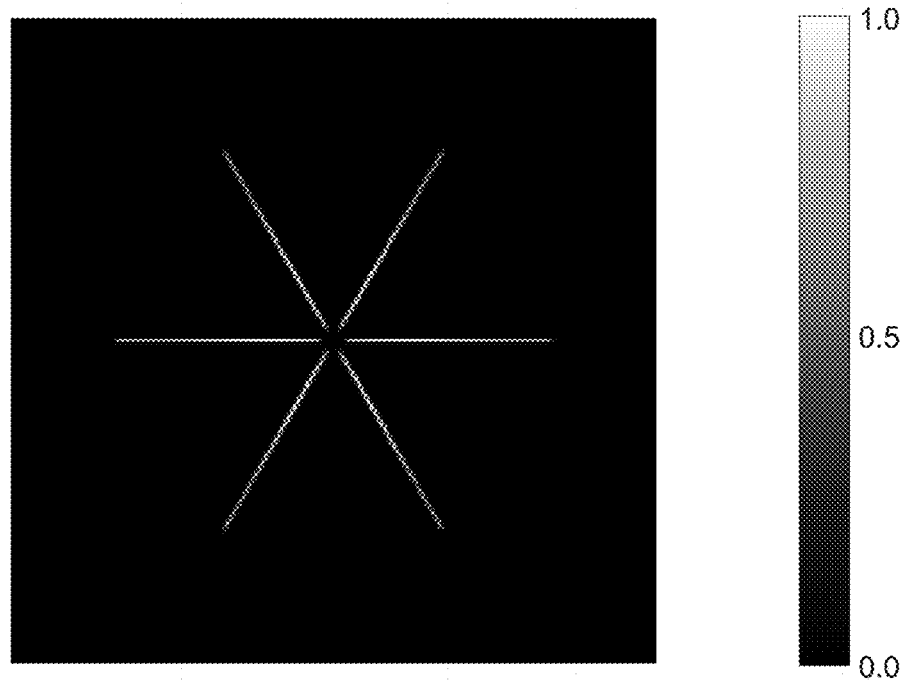
FIG. 16 shows an illuminance distribution in an illuminated area formed by the microlens array of Example 3 on a plane which is 3.0 meters distant from the center A1 of the light source in the direction of the optical axis and which is placed perpendicular to the optical axis.

FIG. 16 shows an illuminance distribution in an illuminated area formed by the microlens array of Example 3 on a plane which is 2.0 meters distant from the center A1 of the light source in the direction of the optical axis and which is placed perpendicular to the optical axis. In FIG. 3 which shows Example 3, the optical axis is in the horizontal direction. The microlens is placed such that two sides of the regular hexagon of the microlens are in the horizontal direction. Accordingly, as shown in FIG. 16, an illuminated area having an irradiance distribution shaped like six lines appears.

FIG. 17 shows an illuminance distribution in the horizontal direction of an illuminated area formed by the microlens of Example 3 on a plane which is 2.0 meters distant from the center A1 of the light source in the direction of the optical axis and which is placed perpendicular to the optical axis. The horizontal axis of FIG. 17 represents position on the plane in the horizontal direction. The position where the optical axis intersects the plane corresponds to the position of coordinate 0.0 on the horizontal axis. The vertical axis of FIG. 17 represents relative illuminance. Relative illuminance of 1 corresponds to the maximum value.

Figure 18:
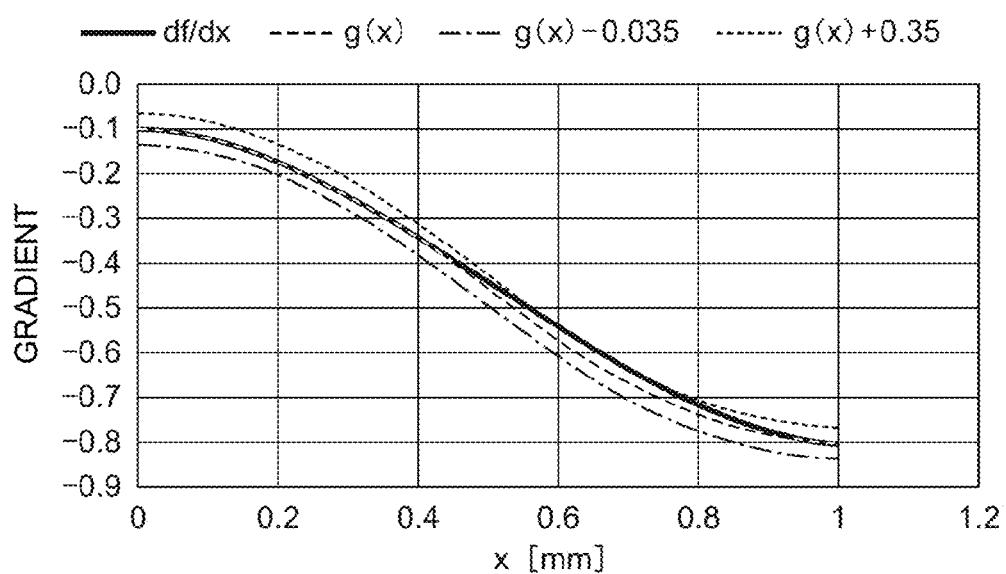
FIG. 18 shows the gradient of the curved surface of the microlens of Example 3.

FIG. 18 shows the gradient of the curved surface of the microlens of Example 3. The horizontal axis of FIG. 18 represents coordinate of x axis of the microlens, and the vertical axis of FIG. 18 represents the gradient of the curved surface of the microlens of Example 3

$$\frac{df(x)}{dx}$$

and the gradient of the virtual curved surface $$g(x) = \frac{dF(x)}{dx}$$

that makes an illuminance distribution uniform. The gradient of the curved surface of the microlens of Example 3 satisfies Expression (10) in the whole range of x. However, in the range of 0.5<x<0.8, the gradient of the curved surface is substantially equal to the upper limit of Expression (10).

Optical System and Optical Element of Example 4

Figure 19:
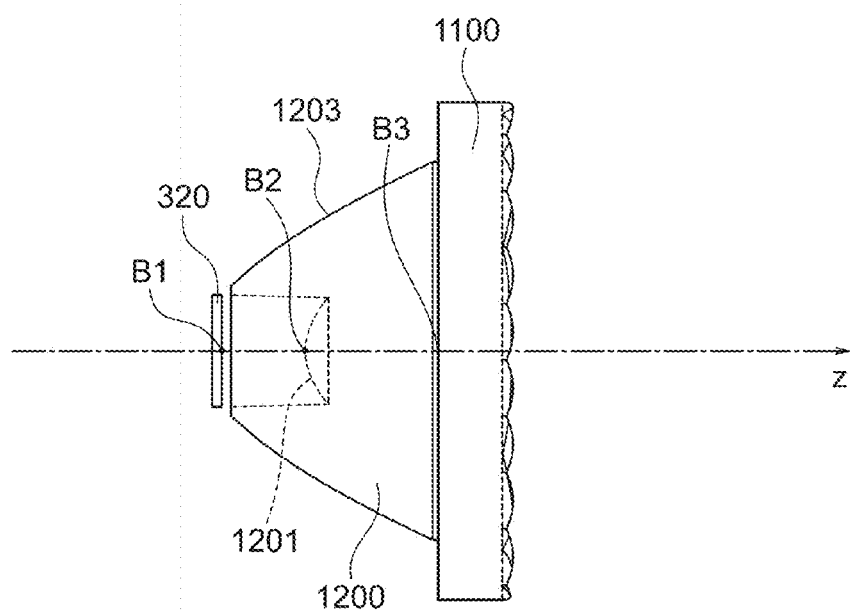
FIG. 19 shows an optical system of Example 4.

FIG. 19 shows an optical system of Example 4. The optical system of Example 4 includes a light source 320, a collimator lens 1200 and a microlens array 1100. The collimator lens 1200 and the microlens array 1100 are formed as a single component. The collimator lens 1200 includes a transmitting surface 1201 and a reflecting surface 1203. Light rays that have been emitted by the light source 320 and pass through the transmitting surface 1201 or are reflected by the reflecting surface 1203 form a bundle of parallel rays and enter the microlens array 1100. The arrangement is made such that the principal axis of the collimator lens 1200 is aligned with the optical axis and the optical axis passes through the center of the light source 320. In FIG. 19, the optical axis is placed in the horizontal direction.

The light source has a circular emitting surface with a diameter of 0.5 millimeters. The light source has a Lambertian emission pattern.

Figure 20:
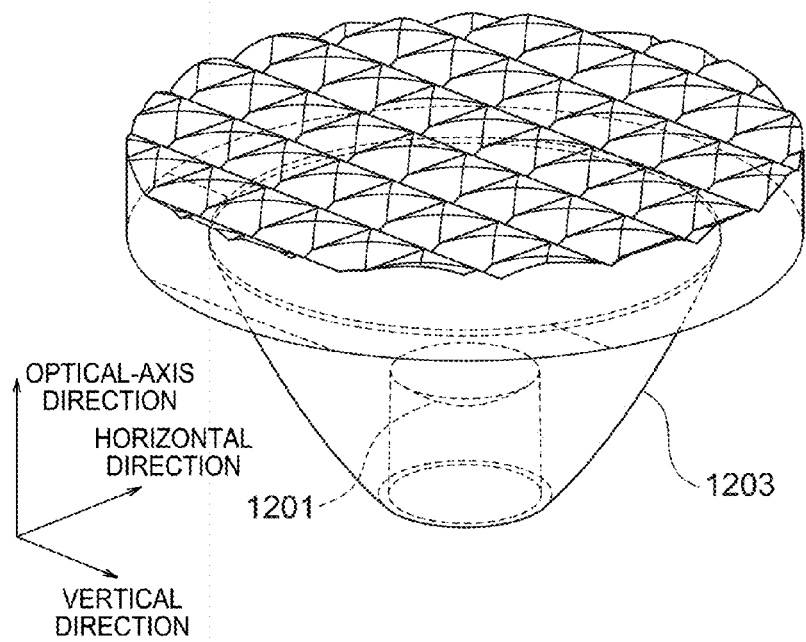
FIG. 20 shows the shape of the microlens array of Example 4.

FIG. 20 shows the shape of the optical element of Example 4. The optical element of Example 4 includes the collimator lens 1200 and the microlens array 1100 provided at the exit side of the collimator lens 1200. The optical element is placed such that two adjacent sides of the square of each microlens are placed respectively in the horizontal direction and in the vertical direction. The material of the optical element is polycarbonate (refractive index: n=1.590). The transmitting surface 1201 of the collimator lens 1200 is convex to the light source side and is aspherical. When distance from the optical axis is represented by r, the shape of the surface is defined by the following expression.

$$z(r) = \frac{1/R \cdot r^2}{1 + \sqrt{1 - (1+k)1/R^2 \cdot r^2}}$$

In the expression, z represents distance from the vertex of the transmitting surface 1201 located on the optical axis to a point on the surface in the z axis direction, and r represents distance from the optical axis to the point on the surface. The parameters defining the transmitting surface 1201 are described below.

Position (with respect to the center of the light source): z=2.25 [mm]
Radius of curvature at the center: R=1.327 [mm]
Conic constant: k=−2.527

The position of the transmitting surface 1201 of the collimator lens means the position of the point of intersection between the transmitting surface 1201 and the optical axis, that is, the position marked with B2 in FIG. 19. The position of B2 is that of the vertex of the above-described transmitting surface 1201. Z=2.25 [mm] means that the distance between the center B1 of the light source and B2 is 2.25 millimeters.

The reflecting surface 1203 of the collimator lens has a shape that is convex to the light source side and is expressed by even-order terms. When distance from the optical axis is represented by r, the shape of the surface is defined by the following expression.

$$z(r) = a_2 r^2 + a_4 r^4 + a_6 r^6$$

In the expression, z represents distance from a point z (0) located on the optical axis to a point on the surface in the z axis direction, and r represents distance from the optical axis to the point on the surface. The point z (0) will be described later. The parameters defining the reflecting surface 1203 of the collimator lens are described below.

Position (with respect to the center of the light source): z=−0.455 [mm]
Aspherical coefficient $a_2$: 3.44E-1
Aspherical coefficient $a_4$: −5.56E-3
Aspherical coefficient $a_6$: 7.68E-5

The position of the reflecting surface 1203 of the collimator lens means the position on the optical axis corresponding to the value of z (0) in the above-described expression representing the reflecting surface 1203. Z=−0.45 [mm] means that the position on the optical axis corresponding to the value of z (0) is on the opposite side of the center B1 of the light source from the microlens array 1100 and 0.455 millimeters distant from the center B1 of the light source.

The end face on the light source side of the collimator lens is on a plane perpendicular to the optical axis. A distance between the point of intersection B1 between the emitting surface and the optical axis and the end face on the light source side of the collimator lens is 0.25 millimeters. The collimator lens has a tapered-cylinder-shaped concavity on the light source side. The central axis of the tapered-cylinder-shaped concavity is on the optical axis. An inside diameter of the tapered-cylinder-shaped concavity at the end on the light source side is 3.022 millimeters, and an inside diameter of the tapered-cylinder-shaped concavity at the end on the microlens side is 2.9 millimeters. The end on the microlens side of the concavity is located on the transmitting surface 1201 and defines the periphery of the transmitting surface 1201. A cross section of the reflecting surface, the cross section being perpendicular to the optical axis, is a circle, and diameter of the circle has the maximum value of 10 millimeters at the end on the microlens side of the reflecting surface 1203.

The parameters defining the microlens array are described below.

Position (with respect to the center of the light source): z=6.0 [mm]

Segment size: 2.0 (horizontal direction)×1.5 (vertical direction) [mm²]

The position of the microlens array 1100 means the position of the point of intersection between the surface without lenses, that is, the bottom of the microlens array 1100 and the optical axis, that is, the position marked with B3 in FIG. 19. z=6.0 [mm] means that the distance between the center B1 of the light source and B3 is 6.0 millimeters. Thickness of the microlens array 1100 is 2.0 millimeters.

The bottom of the microlens array, the bottom being parallel to of the convex polygon, is arranged such that the bottom is perpendicular to the optical axis. The microlens array can be integrated with a collimator lens to form a single component.

The curved surface of the microlens of Example 4 can be represented by the following expression.

$$z = f(x) = \sum_{n=1}^{10} \left(\frac{x}{|x|}\right)^n a_n x^n \quad (11)$$

Table 4 shows coefficients of Expression (11) that represents the curved surface located in the horizontal direction (the curved surface including sides in the horizontal direction of the square) of the microlens of Example 4.

TABLE 4

| a1 | a2 | a3 | a4 | a5 |
|---|---|---|---|---|
| −0.100 | 0.002 | −0.210 | 0.014 | −0.035 |
| a6 | a7 | a8 | a9 | a10 |
| 0.066 | −0.020 | 0.000 | 0.000 | 0.000 |

Table 5 shows coefficients of Expression (11) that represents the curved surface located in the vertical direction (the curved surface including sides in the vertical direction of the square) of the microlens of Example 4.

TABLE 5

| a1 | a2 | a3 | a4 | a5 |
|---|---|---|---|---|
| −0.100 | −0.001 | −0.266 | 0.009 | −0.023 |
| a6 | a7 | a8 | a9 | a10 |
| 0.077 | −0.020 | 0.000 | 0.000 | 0.000 |

Figure 21:
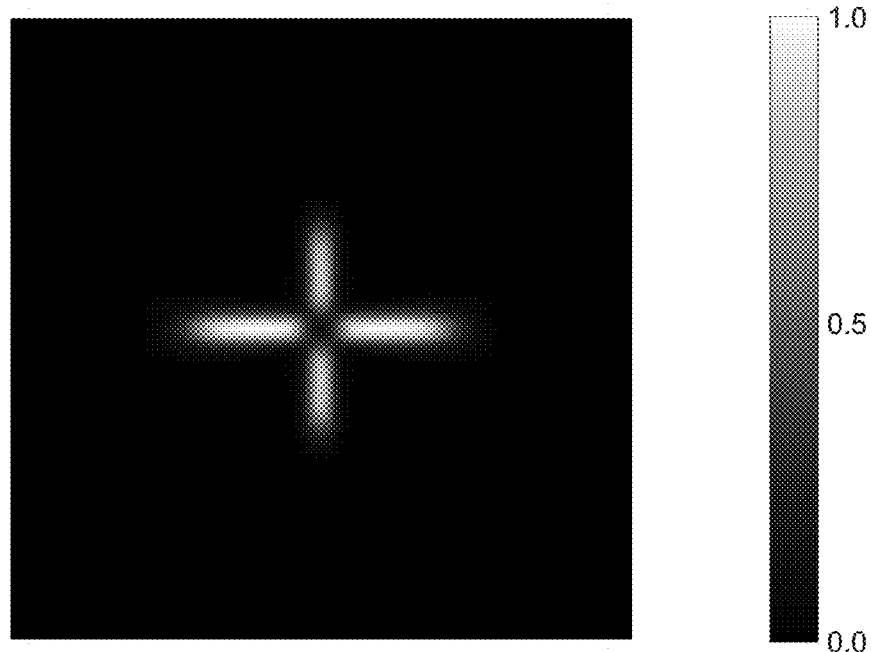
FIG. 21 shows an illuminance distribution in an illuminated area formed by the microlens array of Example 4 on a plane which is 3.0 meters distant from the center B1 of the light source in the direction of the optical axis and which is placed perpendicular to the optical axis.

FIG. 21 shows an illuminance distribution in an illuminated area formed by the microlens array of Example 4 on a plane which is 3.0 meters distant from the center B1 of the light source in the direction of the optical axis and which is placed perpendicular to the optical axis. Each microlens is placed such that two sides of the square of the microlens are in the horizontal direction and the other two sides are in the vertical direction. Accordingly, as shown in FIG. 21, an illuminated area having an irradiance distribution shaped like lines of a predetermined length in the horizontal direction and lines of a different length in the vertical direction appears.

FIG. 22 shows an illuminance distribution in the horizontal direction of an illuminated area formed by the microlens array of Example 4 on a plane which is 3.0 meters distant from the center B1 of the light source in the direction of the optical axis and which is placed perpendicular to the optical axis. The horizontal axis of FIG. 22 represents position on the plane in the horizontal direction. The position where the optical axis intersects the plane corresponds to the position of coordinate 0.0 on the horizontal axis. The vertical axis of FIG. 22 represents relative illuminance. Relative illuminance of 1 corresponds to the maximum value.

FIG. 23 shows an illuminance distribution in the vertical direction of an illuminated area formed by the microlens array of Example 4 on a plane which is 3.0 meters distant from the center B1 of the light source in the direction of the optical axis and which is placed perpendicular to the optical axis. The horizontal axis of FIG. 23 represents position on the plane in the vertical direction. The position where the optical axis intersects the plane corresponds to the position of coordinate 0.0 on the horizontal axis. The vertical axis of FIG. 23 represents relative illuminance. Relative illuminance of 1 corresponds to the maximum value.

Figure 24:
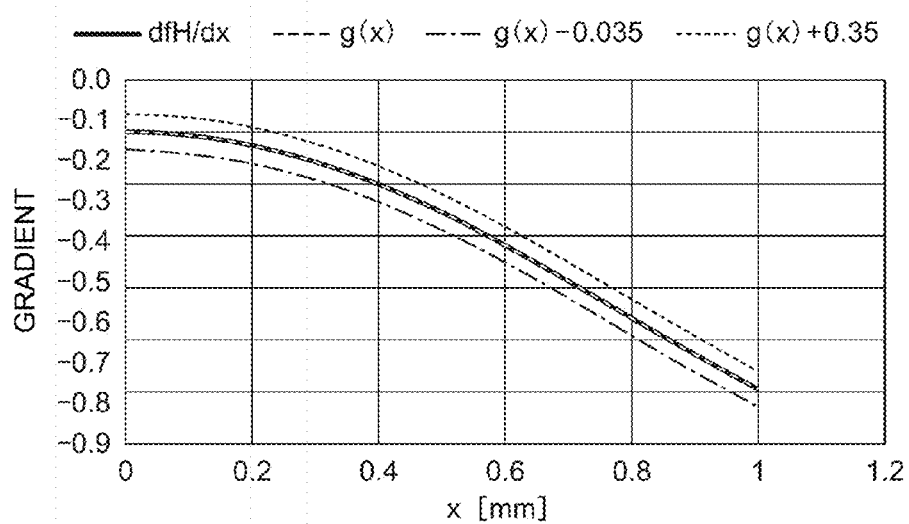
FIG. 24 shows the gradient in the horizontal direction of the curved surface of the microlens of Example 4.

FIG. 24 shows the gradient in the horizontal direction of the curved surface of the microlens of Example 4. The horizontal axis of FIG. 24 represents coordinate of x axis of the microlens, and the vertical axis of FIG. 24 represents the gradient in the horizontal direction of the curved surface of the microlens of Example 4

$$\frac{dfH(x)}{dx}$$

and the gradient of the virtual curved surface $$g(x) = \frac{dF(x)}{dx}$$

that makes an illuminance distribution uniform. The gradient in the horizontal direction of the curved surface of the microlens of Example 4 satisfies Expression (10) in the whole range of x.

Further, since the following relation holds $$\left|\frac{dfH(t)}{dx}\right| = 0.594,$$

concerning the gradient in the horizontal direction of the curved surface of the microlens of Example 4, $$g(x) - 0.015\left|\frac{dfH(t)}{dx}\right| \leq \frac{dfH(x)}{dx} \leq g(x) + 0.015\left|\frac{dfH(t)}{dx}\right|$$

is satisfied in the range of 0.25·t<|x|≤t.

Figure 25:
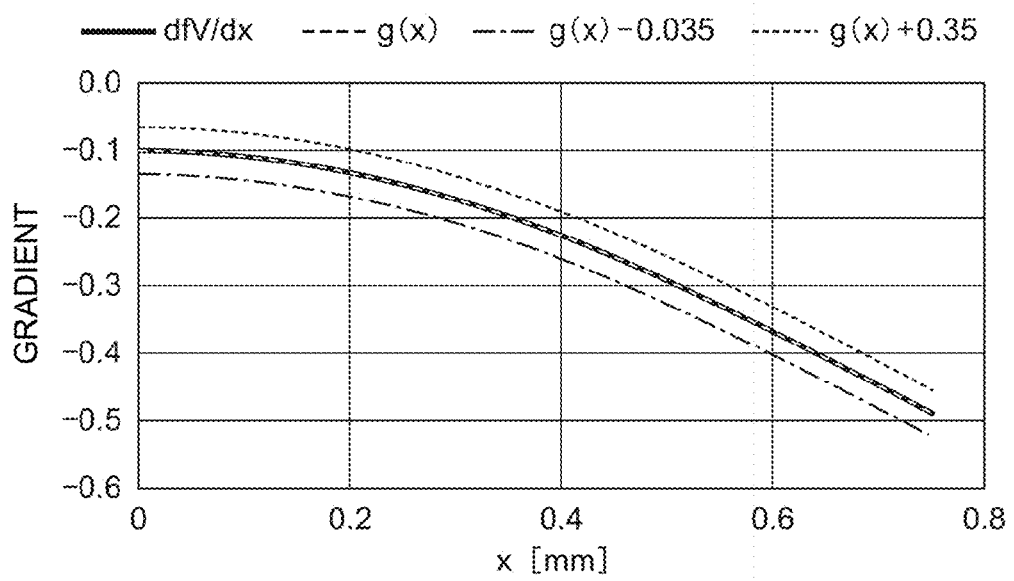
FIG. 25 shows the gradient in the vertical direction of the curved surface of the microlens of Example 4.

FIG. 25 shows the gradient in the vertical direction of the curved surface of the microlens of Example 4. The horizontal axis of FIG. 25 represents coordinate of x axis of the microlens, and the vertical axis of FIG. 25 represents the gradient in the vertical direction of the curved surface of the microlens of Example 4

$$\frac{dfV(x)}{dx}$$

and the gradient of the virtual curved surface $$g(x) = \frac{dF(x)}{dx}$$

that makes an illuminance distribution uniform. The gradient in the horizontal direction of the curved surface of the microlens of Example 4 satisfies Expression (10) in the whole range of x.

Further, since the following relation holds $$\left|\frac{dfV(t)}{dx}\right| = 0.488,$$

concerning the gradient in the horizontal direction of the curved surface of the microlens of Example 4, $$g(x) - 0.015\left|\frac{dfV(t)}{dx}\right| \le \frac{dfV(x)}{dx} \le g(x) + 0.015\left|\frac{dfV(t)}{dx}\right|$$

is satisfied in the range of $0.25 \cdot t < |x| \le t$.

Comparison Between Illuminance Distributions of Examples and Illuminance Distribution of Comparative Example According to FIG. 7, in the illuminance distribution of Example 1, the relative illuminance is 0.95 or more in the range of $0.2 \le |x| \le 2.2$. On the other hand, according to FIG. 10, in the illuminance distribution of Comparative Example, the relative illuminance is less than 0.8 except in the range of $0.3 \le |x| \le 1.2$. Thus, the illuminance distribution of Example 1 is more uniform than that of Comparative Example.

According to FIG. 13, in the illuminance distribution of Example 2, the relative illuminance is 0.9 or more in the range of $0.3 \le |x| \le 2.0$. On the other hand, according to FIG. 10, in the illuminance distribution of Comparative Example, the relative illuminance is less than 0.8 except in the range of $0.3 \le |x| \le 1.2$. Thus, the illuminance distribution of Example 2 is more uniform than that of Comparative Example. Although the gradient of the curved surface of the microlens of Example 2 does not satisfy Expression (10) in the range of x<0.1 as described above, a uniform illuminance distribution is realized.

According to FIG. 17, in the illuminance distribution of Example 3, the relative illuminance is 0.8 or more in the range of $0.2 \le |x| \le 1.3$, and is 0.6 or more in the range of $0.2 \le |x| \le 2.0$. On the other hand, according to FIG. 10, in the illuminance distribution of Comparative Example, the relative illuminance is less than 0.6 except in the range of $0.2 \le |x| \le 1.6$. Thus, the illuminance distribution of Example 3 is more uniform than that of Comparative Example. According to FIG. 18, the gradient of the curved surface of the microlens of Example 3 satisfies Expression (10) in the whole range of x. However, in the range of 0.5<x<0.8, the gradient of the curved surface is substantially equal to the upper limit of Expression (10). If a difference between the gradient of the curved surface of the microlens and the gradient of the virtual curved surface becomes greater than in the present example, the superiority in uniformity of illuminance distribution will be lost.

According to FIG. 22, in the illuminance distribution in the horizontal direction of Example 4, the relative illuminance is 0.8 or more in the range of $0.3 \le |x| \le 1.1$. According to FIG. 23, in the illuminance distribution in the vertical direction of Example 4, the relative illuminance is 0.8 or more in the range of $0.3 \le |x| \le 0.8$. Although a direct comparison with Comparative Example provided with a different optical system is not proper, an illuminated area having a relatively uniform illuminance distribution has been realized.

According to FIGS. 8, 14, 18, 24 and 25, the absolute value of the gradient of the microlens surface at x=t of each of microlenses of Examples 1-4 is 0.45 or more. In general, the gradient of the microlens surface at x=t should preferably be 0.3 or more.

Comparative Example 2

The comparative example of Example 4 is referred to as Comparative Example 2. The optical system of Comparative Example 2 is the same as that of Example 4 except that microlenses are those of Comparative Example of Example 1.

Figure 26:
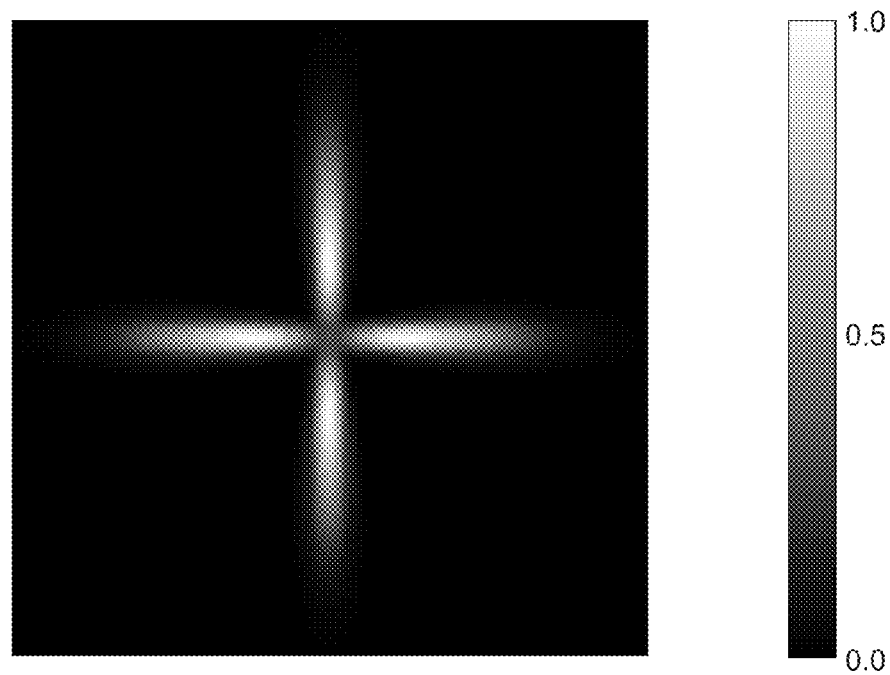
FIG. 26 shows an illuminance distribution in an illuminated area formed by the optical system of Comparative Example 2 on a plane which is 3.0 meters distant from the center B1 of the light source in the direction of the optical axis and which is placed perpendicular to the optical axis.

FIG. 26 shows an illuminance distribution in an illuminated area formed by the optical system of Comparative Example 2 on a plane which is 3.0 meters distant from the center B1 of the light source in the direction of the optical axis and which is placed perpendicular to the optical axis. Each microlens is placed such that two sides of the square of the microlens are in the horizontal direction and the other two sides are in the vertical direction. Accordingly, as shown in FIG. 26, an illuminated area having an irradiance distribution shaped like lines of a predetermined length in the horizontal direction and in the vertical direction appears.

FIG. 27 shows an illuminance distribution in the horizontal direction of an illuminated area formed by the optical system of Comparative Example 2 on a plane which is 3.0 meters distant from the center B1 of the light source in the direction of the optical axis and which is placed perpendicular to the optical axis. The horizontal axis of FIG. 27 represents position on the plane in the horizontal direction. The position where the optical axis intersects the plane corresponds to the position of coordinate 0.0 on the horizontal axis. The vertical axis of FIG. 27 represents relative illuminance. Relative illuminance of 1 corresponds to the maximum value. In a microlens of Comparative Example 2, the shape in the horizontal direction is identical with that in the vertical direction, and therefore an illuminance distribution in the vertical direction is identical with that shown in FIG. 27.

Summarized Data of Shapes of Microlenses of Examples and Comparative Example

Table 6 shows summarized data of shapes of microlenses of Examples and Comparative Example. As shown in FIG.

5, "t" represents distance between the origin and a side of the polygon. "C" and "A" represent constants of Expression (4). "θ," is an acute angle between the direction in which a ray leaving the curved surface CS at the vertex of the microlens travels and z axis, and corresponds to "$\theta_T$" described above. "$\theta_e$" is an acute angle between the direction in which a ray leaving the curved surface CS on a side of the square travels and z axis, and corresponds to "$\theta_S$" described above.

TABLE 6

|  | Example 1 | Example 2 | Example 3 | Example 4-H | Example 4-V | Comparative Example |
|---|---|---|---|---|---|---|
| t | 1.000 | 1.000 | 1.000 | 1.000 | 0.750 | 1.000 |
| C | 0.719 | 0.620 | 0.979 | 0.377 | 0.478 | 0.733 |
| A | 0.030 | 0.050 | 0.059 | 0.059 | 0.059 | 0.000 |
| tan θ c | 0.030 | 0.050 | 0.059 | 0.059 | 0.059 | 0.000 |
| tan θ e | 0.748 | 0.670 | 1.039 | 0.436 | 0.328 | 0.733 |
| θ c | 1.691 | 2.862 | 3.390 | 3.392 | 3.392 | 0.000 |
| θ e | 36.800 | 33.822 | 46.082 | 23.578 | 18.176 | 36.250 |

Illuminance Distributions of Microlenses of Examples and Comparative Example

In Examples 1 to 3 and Comparative Example, a bundle of substantially parallel rays is incident onto the bottom of the microlens arrays. Illuminance distributions of microlenses of Examples and Comparative Example with a bundle of substantially parallel rays will be evaluated below.

FIG. 28 shows positions that correspond to rays travelling in the direction at an acute angle $\theta_c + 0.1(\theta_e - \theta_c)$ (which is referred to as $\theta_1$, hereinafter)

with z axis by broken lines, and positions that correspond to rays travelling in the direction at an acute angle $\theta_e - 0.1(\theta_e - \theta_c)$ (which is referred to as $\theta_2$, hereinafter)

with z axis by dot-and-dash lines in FIG. 7, which shows an illuminance distribution in the horizontal direction of an illuminated area formed by the microlens of Example 1. Relative illuminance by rays with an acute angle between $\theta_1$ and $\theta_2$ inclusive with z axis is 0.96 (96%) or more.

FIG. 29 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 10, which shows an illuminance distribution in the horizontal direction of an illuminated area formed by the microlens of Comparative Example. Relative illuminance by rays with an acute angle between $\theta_1$ and $\theta_2$ inclusive with z axis is 0.37 (37%) or more.

FIG. 30 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 13, which shows an illuminance distribution in the horizontal direction of an illuminated area formed by the microlens of Example 2. Relative illuminance by rays with an acute angle between $\theta_1$ and $\theta_2$ inclusive with z axis is 0.90 (90%) or more.

FIG. 31 shows positions that correspond to rays travelling in the direction at an acute angle $\theta_1$ with z axis by broken lines, and positions that correspond to rays travelling in the direction at an acute angle $\theta_2$ with z axis by dot-and-dash lines in FIG. 17, which shows an illuminance distribution in the horizontal direction of an illuminated area formed by the microlens of Example 3. Relative illuminance by rays with an acute angle between $\theta_1$ and $\theta_2$ inclusive with z axis is 0.68 (68%) or more.

An illuminance distribution obtained when a bundle of substantially parallel rays is incident onto the bottom of the microlens array of Example 4 will be reviewed below.

FIG. 32 shows an illuminance distribution of an illuminated area formed by the microlens array of Example 4 on a plane which is 3.0 meters distant from the center B1 of the light source in the direction of the optical axis and which is placed perpendicular to the optical axis. Each microlens is placed such that two sides of the square of the microlens are in the horizontal direction and the other two sides are in the vertical direction. Accordingly, as shown in FIG. 32, an illuminated area having an irradiance distribution shaped like lines of a predetermined length in the horizontal direction and lines of a different length in the vertical direction appears.

FIG. 33 shows an illuminance distribution in the horizontal direction of an illuminated area formed by the microlens of Example 4 on a plane which is 3.0 meters distant from the center B1 of the light source in the direction of the optical axis and which is placed perpendicular to the optical axis. The horizontal axis of FIG. 33 represents position on the plane in the horizontal direction. The position where the optical axis intersects the plane corresponds to the position of coordinate 0.0 on the horizontal axis. The vertical axis of FIG. 33 represents relative illuminance. Relative illuminance of 1 corresponds to the maximum value. In FIG. 33, positions that correspond to rays travelling in the direction at an acute angle $\theta_1$ with z axis are represented by broken lines, and positions that correspond to rays travelling in the direction at an acute angle $\theta_2$ with z axis are represented by dot-and-dash lines. Relative illuminance by rays with an acute angle between $\theta_1$ and $\theta_2$ inclusive with z axis is 0.80 (80%) or more.

FIG. 34 shows an illuminance distribution in the vertical direction of an illuminated area formed by the microlens of Example 4 on a plane which is 3.0 meters distant from the center B1 of the light source in the direction of the optical axis and which is placed perpendicular to the optical axis. The horizontal axis of FIG. 34 represents position on the plane in the vertical direction. The position where the optical axis intersects the plane corresponds to the position of coordinate 0.0 on the horizontal axis. The vertical axis of FIG. 33 represents relative illuminance. Relative illuminance of 1 corresponds to the maximum value. In FIG. 34, positions that correspond to rays travelling in the direction at an acute angle $\theta_1$ with z axis are represented by broken lines, and positions that correspond to rays travelling in the direction at an acute angle $\theta_2$ with z axis are represented by dot-and-dash lines. Relative illuminance by rays with an acute angle between $\theta_1$ and $\theta_2$ inclusive with z axis is 0.92 (92%) or more.

Table 7 shows summarized data of illuminance distributions formed when a bundle of parallel rays is incident onto the microlenses of Examples 1 to 4 and Comparative Example. In the table, "distance" represents distance in the optical axis direction from the center of the light source to the evaluation surface. "Start point of evaluation range" represents distance in the horizontal direction or in the vertical direction between the position that the ray at angle $\theta_c+0.1(\theta_e-\theta_c)$, that is $\theta_1$, reaches the evaluation plane and the position of intersection between the optical axis and the evaluation plane. "End point of evaluation range" represents distance in the horizontal direction or in the vertical direction between the position that the ray at angle $\theta_e-0.1(\theta_e-\theta_c)$, that is $\theta_2$, reaches the evaluation plane and the position of intersection between the optical axis and the evaluation plane. The values of "start point of evaluation range" correspond to the absolute values of the horizontal axis coordinates of the broken lines in FIGS. 28 to 31, FIG. 33 and FIG. 34. The values of "end point of evaluation range" correspond to the absolute values of the horizontal axis coordinates of the dot-and-dash lines in FIGS. 28 to 31, FIG. 33 and FIG. 34. "Degree of uniformity" represents the minimum value of relative illuminance in the evaluation range between the start point of the evaluation range and the end point of the evaluation range. The more degree of uniformity, the more uniform the illuminance distribution becomes.

FIG. 36 shows positions that correspond to rays travelling in the direction at an acute angle $\theta_3$ with z axis by broken lines, and positions that correspond to rays travelling in the direction at an acute angle $\theta_4$ with z axis by dot-and-dash lines in FIG. 23, which shows an illuminance distribution in the vertical direction of an illuminated area formed by the optical system of Example 4. Relative illuminance by rays with an acute angle between $\theta_3$ and $\theta_4$ inclusive with z axis is 0.68 (68%) or more.

FIG. 37 shows positions that correspond to rays travelling in the direction at an acute angle $\theta_3$ with z axis by broken lines, and positions that correspond to rays travelling in the direction at an acute angle $\theta_4$ with z axis by dot-and-dash lines in FIG. 27, which shows an illuminance distribution in the horizontal direction of an illuminated area formed by the optical system of Comparative Example 2. Relative illuminance by rays with an acute angle between $\theta_3$ and $\theta_4$ inclusive with z axis is 0.45 (45%) or more.

Table 8 shows summarized data of illuminance distributions formed by the optical system of Examples 4 and that of Comparative Example 2. In the table, "distance" represents distance in the optical axis direction from the center of the light source to the evaluation surface. "Start point of evaluation range" represents distance in the horizontal direction or in the vertical direction between the position that the

TABLE 7

|  | Example 1 | Example 2 | Example 3 | Example 4-H | Example 4-V | Comparative Example |
|---|---|---|---|---|---|---|
| $\theta_c + 0.1(\theta_e - \theta_c)$ | 5.202 | 5.958 | 7.660 | 5.411 | 4.871 | 3.625 |
| $\theta_e - 0.1(\theta_e - \theta_c)$ | 33.289 | 30.726 | 41.813 | 21.559 | 16.698 | 32.625 |
| Distance (mm) | 3000 | 3000 | 2000 | 3000 | 3000 | 3000 |
| Start point of evaluation range (mm) | 273.125 | 313.109 | 268.974 | 284.146 | 255.635 | 190.042 |
| End point of evaluation range (mm) | 1969.792 | 1783.120 | 1789.023 | 1185.322 | 899.927 | 1920.454 |
| Degree of uniformity | 96% | 90% | 68% | 80% | 92% | 37% |

According to Table 7, the values of degree of uniformity obtained when a bundle of parallel rays is incident onto the microlenses of Examples 1 to 4 are 65% or more. On the other hand, the value of degree of uniformity obtained when a bundle of parallel rays is incident onto the microlens of Comparative Example is 37%.

Illuminance Distributions of Optical Systems of Example 4 and Comparative Example 2

FIG. 35 shows positions that correspond to rays travelling in the direction at an acute angle $\theta_c+0.2(\theta_e-\theta_c)$ (which is referred to as $\theta_3$, hereinafter)

with z axis by broken lines, and positions that correspond to rays travelling in the direction at an acute angle $\theta_e-0.2(\theta_e-\theta_c)$ (which is referred to as $\theta_4$, hereinafter)

with z axis by dot-and-dash lines in FIG. 22, which shows an illuminance distribution in the horizontal direction of an illuminated area formed by the optical system of Example 4. Relative illuminance by rays with an acute angle between $\theta_3$ and $\theta_4$ inclusive with z axis is 0.80 (80%) or more.

ray at angle $\theta_c+0.2(\theta_e-\theta_c)$, that is $\theta_3$, reaches the evaluation plane and the position of intersection between the optical axis and the evaluation plane. "End point of evaluation range" represents distance in the horizontal direction or in the vertical direction between the position that the ray at angle $\theta_e-0.2(\theta_e-\theta_c)$, that is $\theta_4$, reaches the evaluation plane and the position of intersection between the optical axis and the evaluation plane. The values of "start point of evaluation range" correspond to the absolute values of the horizontal axis coordinates of the broken lines in FIGS. 35 to 37. The values of "end point of evaluation range" correspond to the absolute values of the horizontal axis coordinates of the dot-and-dash lines in FIGS. 35 to 37.

TABLE 8

|  | Example 4-H | Example 4-V | Comparative Example 2 |
|---|---|---|---|
| $\theta_c + 0.2(\theta_e - \theta_c)$ | 7.429 | 6.349 | 7.250 |
| $\theta_e - 0.2(\theta_e - \theta_c)$ | 19.541 | 15.220 | 29.000 |
| Distance (mm) | 3000 | 3000 | 3000 |
| Start point of evaluation range (mm) | 391.188 | 333.797 | 381.637 |
| End point of evaluation range (mm) | 1064.758 | 816.181 | 1662.948 |
| Degree of uniformity | 80% | 68% | 45% |

According to Table 8, the values of degree of uniformity obtained by the optical system of Example 4 are 65% or more. On the other hand, the value of degree of uniformity obtained by the optical system of Comparative Example 2 is 45%.

What is claimed is:

1. A microlens array provided with a plurality of microlenses,
   wherein each microlens contains N sides of a convex polygon, a microlens vertex that is away from a plane of the convex polygon, and N curved surfaces divided by lines connecting the microlens vertex and the N vertices of the convex polygon, and when the straight line that passes through the microlens vertex and is perpendicular to the plane of the convex polygon is defined as a z axis, the point of intersection between the z axis and the plane of the convex polygon is defined as the origin, the straight line in the plane of the convex polygon that passes through the origin and is perpendicular to a side of the convex polygon is defined as an x axis, a z coordinate of one of the N curved surfaces corresponding to the side is determined by an x coordinate alone and is represented by a function $z=f(x)$, a distance from the origin to the side is represented as t, refractive index of a material of the microlens is $n_0$, A represents a nonnegative constant, C represents a positive constant, and $g(x)$ is defined by $$g(x) = \frac{-x}{|x|} \cdot \frac{Cx^2 + A}{n_0\sqrt{1 + (Cx^2 + A)^2} - 1},$$

$f(x)$ is determined such that $$g(x) - 0.035 \leq \frac{df(x)}{dx} \leq g(x) + 0.035$$

is satisfied in $0.25 \cdot t < |x| \leq t$, and
   wherein when an acute angle formed between the direction in which a ray that travels in the z axis direction and is orthogonally incident on the plane travels after exiting from the one of the N curved surfaces and the z axis is represented by $\theta$, and $\theta_c$ and $\theta_e$ are defined such that $$A = \tan\theta c$$
$$C = \frac{\tan\theta e - \tan\theta c}{t^2},$$

$$\left|\frac{df(x)}{dx}\right| \geq 0.3$$

are satisfied,
is satisfied at $|x|=t$, and
$f(x)$ is determined such that when values of relative illuminance are defined such that the value corresponding to the maximum illuminance is 1, the values are 0.65 or more in an area corresponding to the rays with $\theta$ in the range of $\theta_c + 0.1(\theta_e - \theta_c) \leq \theta \leq \theta_e - 0.1(\theta_e - \theta_c)$.

2. A microlens array according to claim 1, wherein each microlens is configured such that $$g(x) - 0.015 \cdot D \leq \frac{df(x)}{dx} \leq g(x) + 0.015 \cdot D$$

is satisfied in $0.25 \cdot t < |x| \leq t$, D being a value of $$\left|\frac{df(x)}{dx}\right|$$

at $|x|=t$.

3. A microlens array according to claim 1, wherein the convex polygon is a regular polygon.

4. A microlens array according to claim 3, wherein the z axis is defined such that it passes through the center of the regular polygon.

5. A microlens array according to claim 1, wherein N is 3, 4 or 6.

6. A microlens array according to claim 1, wherein each microlens is formed such that adjacent curved surfaces are different in shape from each other.

7. A microlens array according to claim 1, integrated with a collimator lens to form a single component.

8. A microlens array according to claim 1, wherein the curved surface of the microlens is represented by $$z = f(x) = \sum_{n=1}^{10} \left(\frac{x}{|x|}\right)^n a_n x^n$$

where n represents a positive integer and $a_n$ represents a constant.

* * * * *